(12) United States Patent
Tvetene et al.

(10) Patent No.: US 10,039,221 B2
(45) Date of Patent: Aug. 7, 2018

(54) SOD HARVESTER WITH FLAP CONTROL DEVICE

(71) Applicant: Trebro Holding, Inc., Billings, MT (US)

(72) Inventors: Gregg L. Tvetene, Billings, MT (US); Timothy Boelter, Billings, MT (US); Jake Bies, Billings, MT (US)

( * ) Notice: Subject to any disclaimer, the term of this patent is extended or adjusted under 35 U.S.C. 154(b) by 70 days.

(21) Appl. No.: 15/260,212

(22) Filed: Sep. 8, 2016

(65) Prior Publication Data

US 2017/0049036 A1   Feb. 23, 2017

Related U.S. Application Data

(63) Continuation of application No. 14/696,453, filed on Apr. 26, 2015, now Pat. No. 9,648,797.

(51) Int. Cl.
*A01G 20/15* (2018.01)
*A01B 45/04* (2006.01)
*A01B 76/00* (2006.01)

(52) U.S. Cl.
CPC ............ *A01B 45/045* (2013.01); *A01B 76/00* (2013.01); *A01G 20/15* (2018.02)

(58) Field of Classification Search
CPC .................................................. A01B 45/045
USPC .................................................... 172/19, 20
See application file for complete search history.

(56) References Cited

U.S. PATENT DOCUMENTS

| 3,540,535 | A | 11/1970 | Brouwer et al. |
| 3,790,096 | A | 2/1974 | Brouwer |
| 4,142,691 | A | 3/1979 | Watton |
| 7,021,584 | B2 | 4/2006 | Hendriks et al. |
| 2001/0050174 | A1 | 12/2001 | Van Vuuren |
| 2004/0079537 | A1 | 4/2004 | Brouwer et al. |
| 2004/0188106 | A1 | 9/2004 | Hendriks et al. |

*Primary Examiner* — Thomas B Will
*Assistant Examiner* — Joel F. Mitchell
(74) *Attorney, Agent, or Firm* — Antonette M. Tease

(57) ABSTRACT

A sod harvester with a start gate, a first switch that is configured to interact with a first sensor, a second switch that is configured to interact with a second sensor, an inclined conveyor, a rollup conveyor positioned above an end of the inclined conveyor, and a controller including controller software that is configured to cause the rollup conveyor to start upon activation of the second sensor, a timer to begin counting time upon activation of the first sensor, and the rollup conveyor to stop upon the counting of a certain amount of time by the timer. The first switch is positioned between the start gate and the second switch, and the second switch is positioned between the first switch and the rollup conveyor. The inclined conveyor is configured to eject a sod roll onto a platform upon cessation of rotation by the rollup conveyor.

1 Claim, 24 Drawing Sheets

SOD HARVESTER WITH FLAP CONTROL DEVICE

CROSS-REFERENCE TO RELATED APPLICATIONS

This application is a continuation-in-part of U.S. patent application Ser. No. 14/696,453 filed on Apr. 26, 2015, which is a continuation-in-part of U.S. patent application Ser. No. 13/946,956 filed on Jul. 19, 2013, now U.S. Pat. No. 9,426,937. The contents of both of these applications are incorporated herein by reference.

BACKGROUND OF THE INVENTION

1. Field of the Invention

The present invention relates generally to the field of sod harvesters, and more specifically, to a sod harvester with a flap control device for consistently and neatly rolling pieces of sod so that the end of the flap is situated at roughly the same position on each roll of sod.

2. Description of the Related Art

Sod harvesters for cutting strips of sod from the ground, rolling them into sod rolls, and stacking the sod rolls onto pallets have existed for a number of years. Various sod harvester innovations have been patented, several of which relate to the rolling of sod pieces, and at least one of which has attempted to solve the same problem as the present invention. U.S. Pat. No. 7,021,584 discloses a sod roller for automatically controlling the angular position of the end or flap of a roll of sod about the roll. The latter invention differs structurally from the present invention in a number of respects, including, but not limited to, the fact that it utilizes three conveyors rather than two, and it also incorporates a sensor for measuring displacement of the transport conveyor. The transport conveyor sensor is not needed in the present invention.

When sod is sold at commercial establishments, it is typically stacked several rows high on a pallet. The more neatly the stack appears, the more likely it is to be sold. In addition, neatly stacked rolls are less likely to fall off of the pallet. In both of these respects, the placement of the end of the flap on the sod roll is important. If the end of the flap is located at roughly the same position on each of the sod rolls, this creates a more uniform appearance and adds stability to the overall configuration of the sod rolls. The present invention is designed to ensure that the end of the flap on a roll of sod is situated at roughly the same position on each roll of sod that comes off of the sod harvester.

Other innovations relating to sod rollers include U.S. Pat. No. 3,790,096 (Brouwer, 1974) (device for starting a turn in the end of a sod strip); U.S. Pat. No. 4,142,691 (Watton, 1979) (apparatus for starting a turn in a strip of sod travelling along a conveyor); U.S. Pat. No. 6,834,729 (Brouwer et al., 2004) (pre-starter for starting a turn in the end of a sod strip travelling up a conveyor); and U.S. Patent Application No. 2001/0050174 (Van Vuuren) (in one embodiment, incorporating a rolling conveyor between the receiving and discharge ends of the conveyor head for purposes of rolling cut grass sods). None of these innovations, however, is concerned with the consistent positioning of the end of the flap on the sod roll.

BRIEF SUMMARY OF THE INVENTION

The present invention is a sod harvester comprising: a start gate; a first switch that is configured to interact with a first sensor; a second switch that is configured to interact with a second sensor; an inclined conveyor with a first end and a second end; a rollup conveyor positioned above the second end of the inclined conveyor; and a controller including controller software that is configured to cause the rollup conveyor to start upon activation of the second sensor, a timer to begin counting time upon activation of the first sensor, and the rollup conveyor to stop upon the counting of a certain amount of time by the timer; wherein the first switch is positioned between the start gate and the second switch; wherein the second switch is positioned between the first switch and the rollup conveyor; and wherein the inclined conveyor is configured to eject a sod roll onto a platform upon cessation of rotation by the rollup conveyor.

In a preferred embodiment, the first sensor is configured to be activated by movement of a trailing edge of a sod piece from underneath a bottom end of the first switch and movement of a top end of the first switch into proximity with the first sensor. Preferably, the second sensor is configured to be activated by movement of a piece of sod to cause the second switch to change position and move into proximity with the second sensor.

In a preferred embodiment, the bottom end of the first switch extends through a front rollup ladder, the start gate is attached to the front rollup ladder, and the front rollup ladder is configured to maintain pressure on the sod roll on the inclined conveyor until the sod roll is ejected. Preferably, the rollup conveyor is situated within a rear rollup frame. In one embodiment, the second switch is situated on the front rollup ladder. In an alternate embodiment, the second switch is situated on the rear rollup frame.

In a preferred embodiment, the inclined conveyor and the rollup conveyor are configured to move at a same speed and in a same direction rotationally. Preferably, the certain amount of time counted by the timer is adjustable by an operator. The controller software is preferably configured to scale the certain amount of time during which the rollup conveyor rotates based upon conveyor speed.

In a preferred embodiment, the invention further comprises a bumper that is secured to a rear of the rear rollup frame, the bumper extending beneath the rollup conveyor along a width of the rollup conveyor and configured to prevent from over-rotating an end flap on a first sod roll in a plurality of sod rolls that are picked up simultaneously by a sod carrier and deposited simultaneously onto a pallet, each of the sod rolls in the plurality of sod rolls having an end flap, the end flap on all but the first sod roll in the plurality of sod rolls being at a same position, the end flap on the first sod roll being in a different position, and the end flap on the first sod roll being at a position between nine o'clock and twelve o'clock when the first sod roll is viewed from a side of the first sod roll.

REFERENCE NUMBERS

Figure 1:
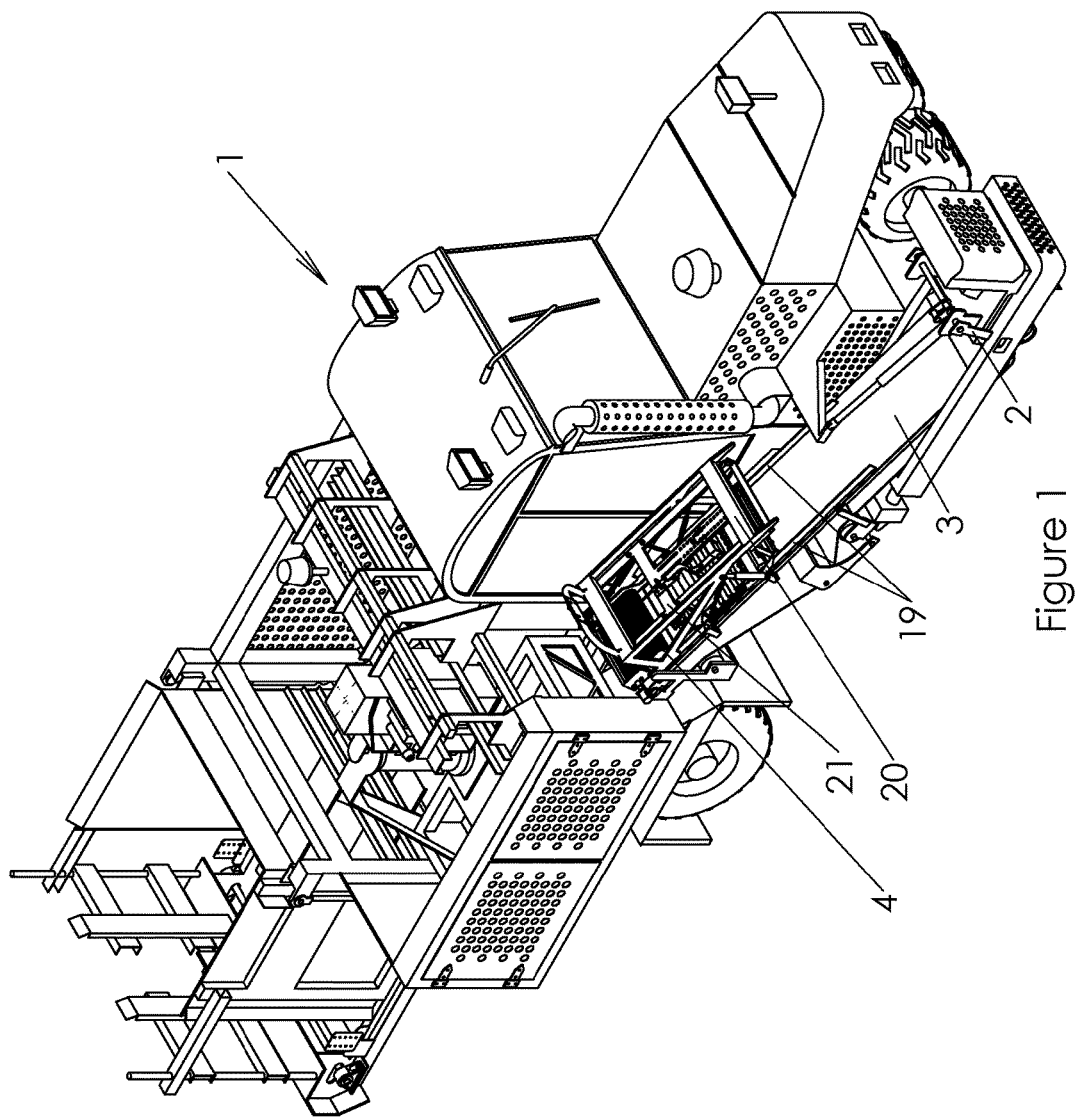
FIG. 1 is a perspective view of a sod harvester with the flap control device of the present invention.

1 Sod harvester
2 Sod cutting knife
3 Inclined conveyor
4 Rollup conveyor
5 Tension roller
6 Front rollup ladder
7 Rear rollup frame
8 Sod piece
9 Start gate
10 Pivot rod
11 Chain
11a Spring (on start gate)
11b Spring (on first switch)
12 First switch
12a Bottom end (of first switch)
12b Top end (of first switch)
13 First sensor
14 Second switch
15 Second sensor
16 Encoder
17 Hydraulic motor
18 Platform
19 Conveyor side rail
20 Main frame
21 Hanger frame
22 Collar (first switch)
23 Turn buckle
24 Bolt
25 Support bracket
26 Plate
27 End collar
28 Collar (second switch)
29 Rubber bumper

DETAILED DESCRIPTION OF INVENTION

FIG. 1 is a perspective view of a sod harvester with the flap control device of the present invention. As shown in this figure, the sod harvester 1 comprises a sod cutting knife 2, an inclined conveyor 3, and a rollup conveyor 4. The rollup conveyor 4 is situated directly on top of the upper part of the inclined conveyor 3. The conveyor side rail 19 and main frame 20 have been removed from subsequent figures for clarity.

Figure 2:
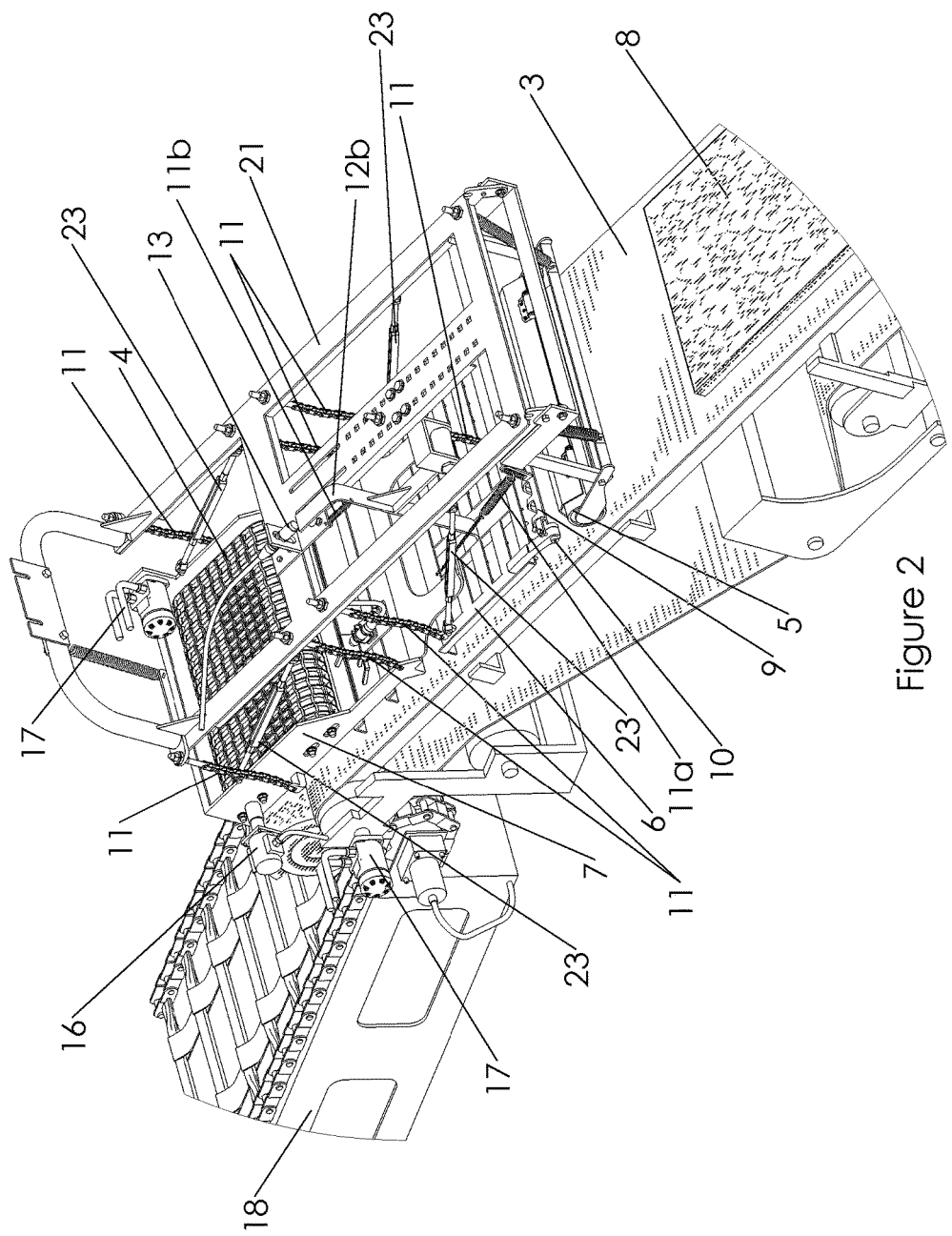
FIG. 2 is a perspective view of the flap control device of the present invention shown with a sod piece on the inclined conveyor.
Figure 3:
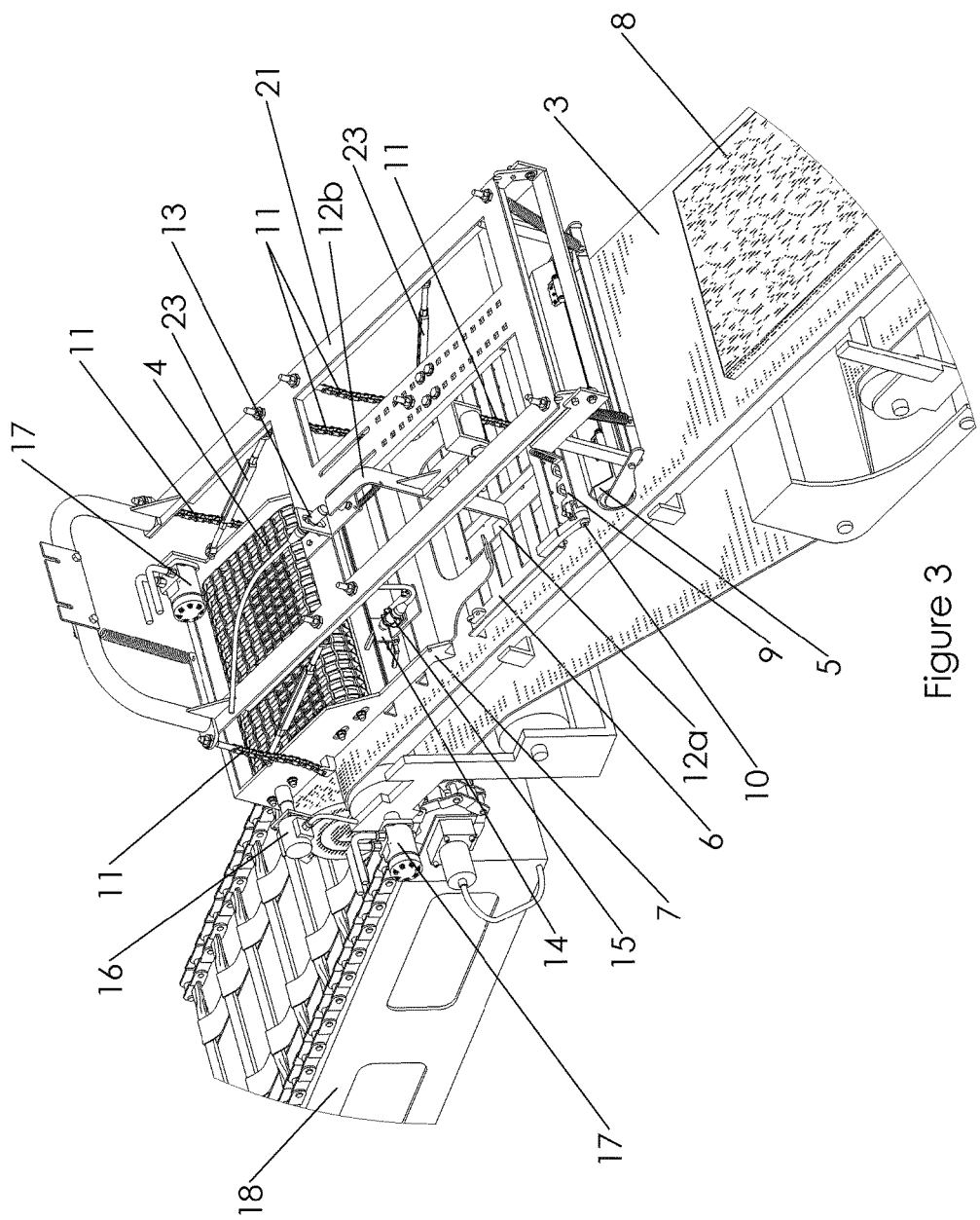
FIG. 3 is the same view shown in FIG. 2 except that two of the chains, one turn buckle, and the start gate spring have been removed for clarity.

FIG. 2 is a first perspective view of the flap control device of the present invention shown with a sod piece on the inclined conveyor. FIG. 3 is the same view shown in FIG. 2 except that two of the chains 11, one turn buckle 23, and the start gate spring 11a have been removed for clarity. In this figure, the sod piece 8 has not yet come into contact with the start gate 9 of the flap control device. As shown in this figure, the flap control device comprises a tension roller 5, a front rollup ladder 6, and a rear rollup frame 7. The tension roller 5 is configured to ensure that the piece of sod 8 on the inclined conveyor 3 maintains contact with the inclined conveyor 3. The front rollup ladder 6 comprises a start gate 9 that pivots on two pivot rods 10 on either end of the start gate 9.

Note that although turn buckles 23 are shown in the accompanying figures, the present invention is not limited to the use of turn buckles 23 to support the front rollup ladder 6. Any method of supporting the front rollup ladder 6 may be used. Note also that although two pivot rods 10 are shown, the start gate 9 may pivot on a single pivot rod 10 that extends from one end of the start gate 9 to the other. In addition, the present invention is not limited to the use of chains 11 to suspend the front rollup ladder 6 or the rear rollup frame 7, nor is it limited to any particular number of chains 11.

When a piece of sod 8 moves upward on the inclined conveyor 3, it first passes underneath the tension roller 5. Next, the leading edge of the piece of sod 8 comes into contact with the start gate 9, which causes the piece of sod 8 to being rolling up. A spring 11a is used to adjust the tension on the start gate 9. Note that both the front rollup ladder 6 and the rear rollup frame 7 are preferably suspended by chains 11 so that they can move upward to accommodate the growing sod roll as it passes underneath them. The rollup conveyor 4 is attached to and situated within the rear rollup frame 7 so that it moves upward with the entire rear rollup frame 7.

Figure 9:
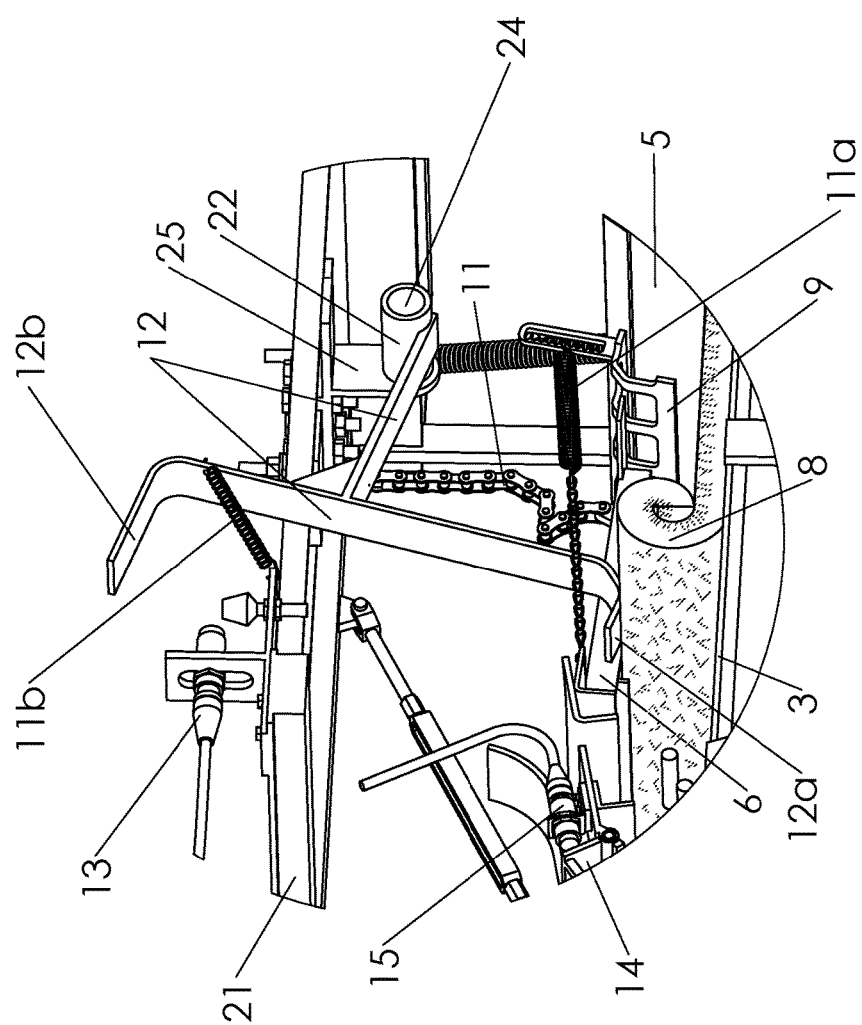
FIG. 9 is a second detail perspective view of what is shown in FIG. 7.

A first switch 12 is attached (welded) to a collar 22 that pivots about a bolt (see FIG. 9). A spring 11b attached to the first switch 12 and to the hanger frame 21 biases the first switch downward. The bottom end 12a of the first switch 12 extends through the front rollup ladder 6 so that it is in a position to come into contact with a piece of sod 8 as it moves up the inclined conveyor 3. The top end 12b of the first switch 12 is configured to interact with a first sensor 13. A second switch 14 is attached to two end collars 27 that pivot about a bolt 24 (see FIGS. 10B and 12B); the second switch 14 is configured to interact with a second sensor 15. The function of the first and second sensors 13, 15 is discussed below. Although the first and second sensors 13, 15 are depicted as proximity sensors in the drawings, any suitable type of sensor (for example, an optical sensor) may be used.

The inclined conveyor 3 and rollup conveyor 4 are preferably powered by hydraulic motors 17. During operation of the sod harvester 1, the inclined conveyor 3 is in continuous movement, whereas the rollup conveyor 4 starts and stops based on the activation or deactivation of the first and second sensors 13, 15, as explained more fully below. When the rollup conveyor 4 is on, it rotates at the same speed and in the same direction as the inclined conveyor 3 (that is, counterclockwise from the perspective of the viewer in FIG. 4B).

Figure 4A:
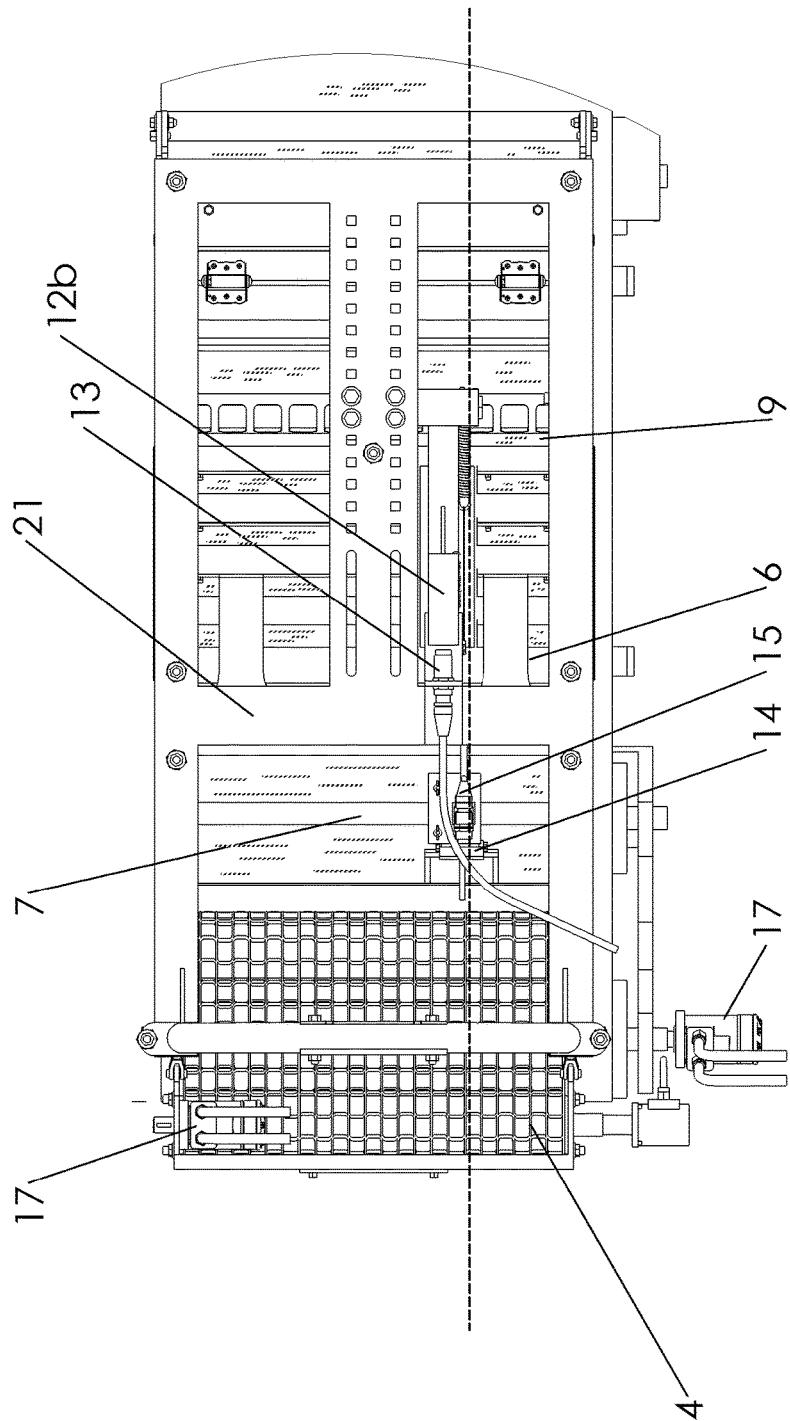
FIG. 4A is a top view of the flap control device indicating where the section view of FIG. 4B has been taken.
Figure 4B:
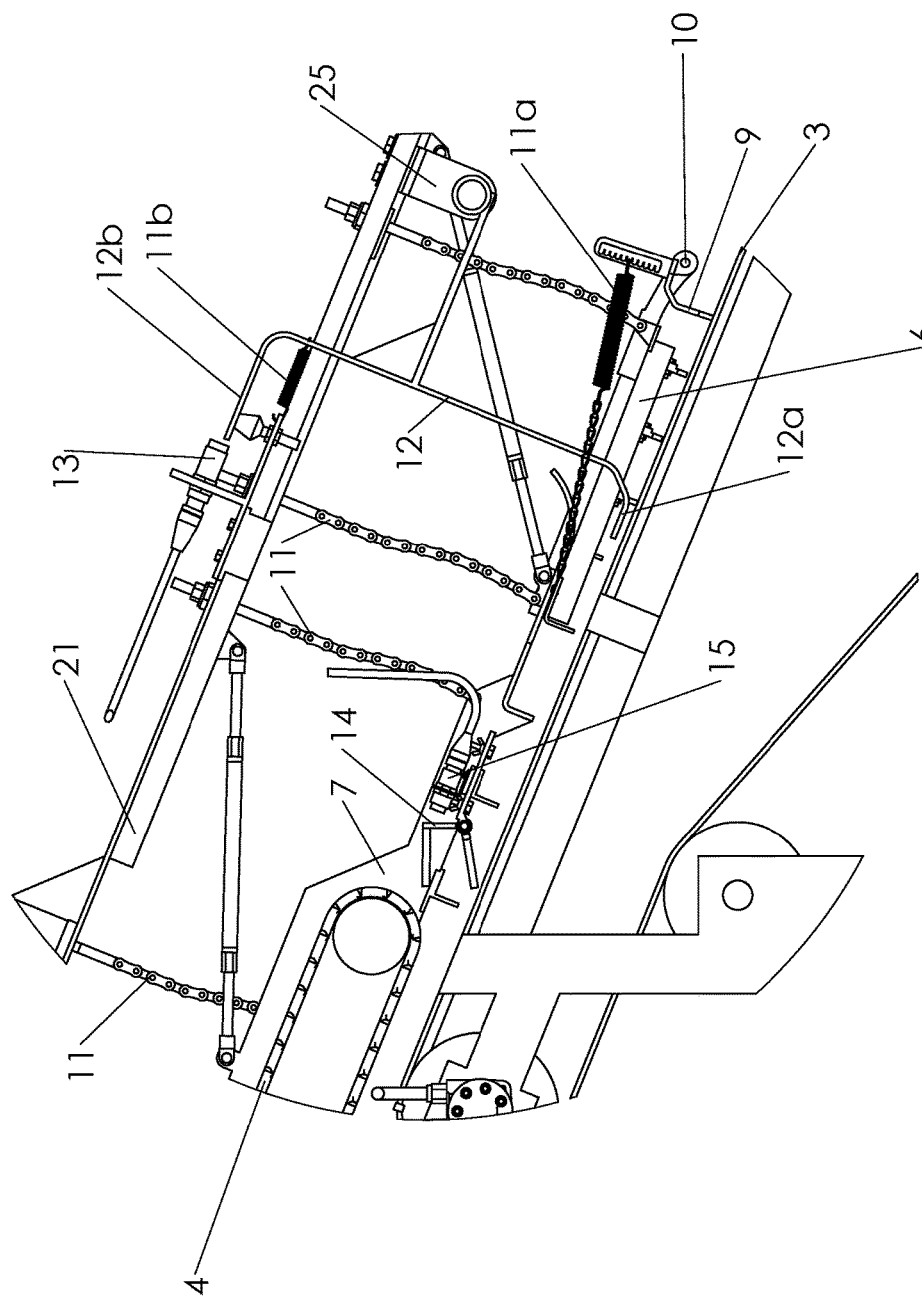
FIG. 4B is a side section view of what is shown in FIG. 3.

FIG. 4A is a top view of the flap control device indicating where the section view of FIG. 4B has been taken. FIG. 4B is a side section view of what is shown in FIG. 3. FIG. 4B shows the relation of the first and second switches 12, 14 to the inclined conveyor 3.

Figure 5:
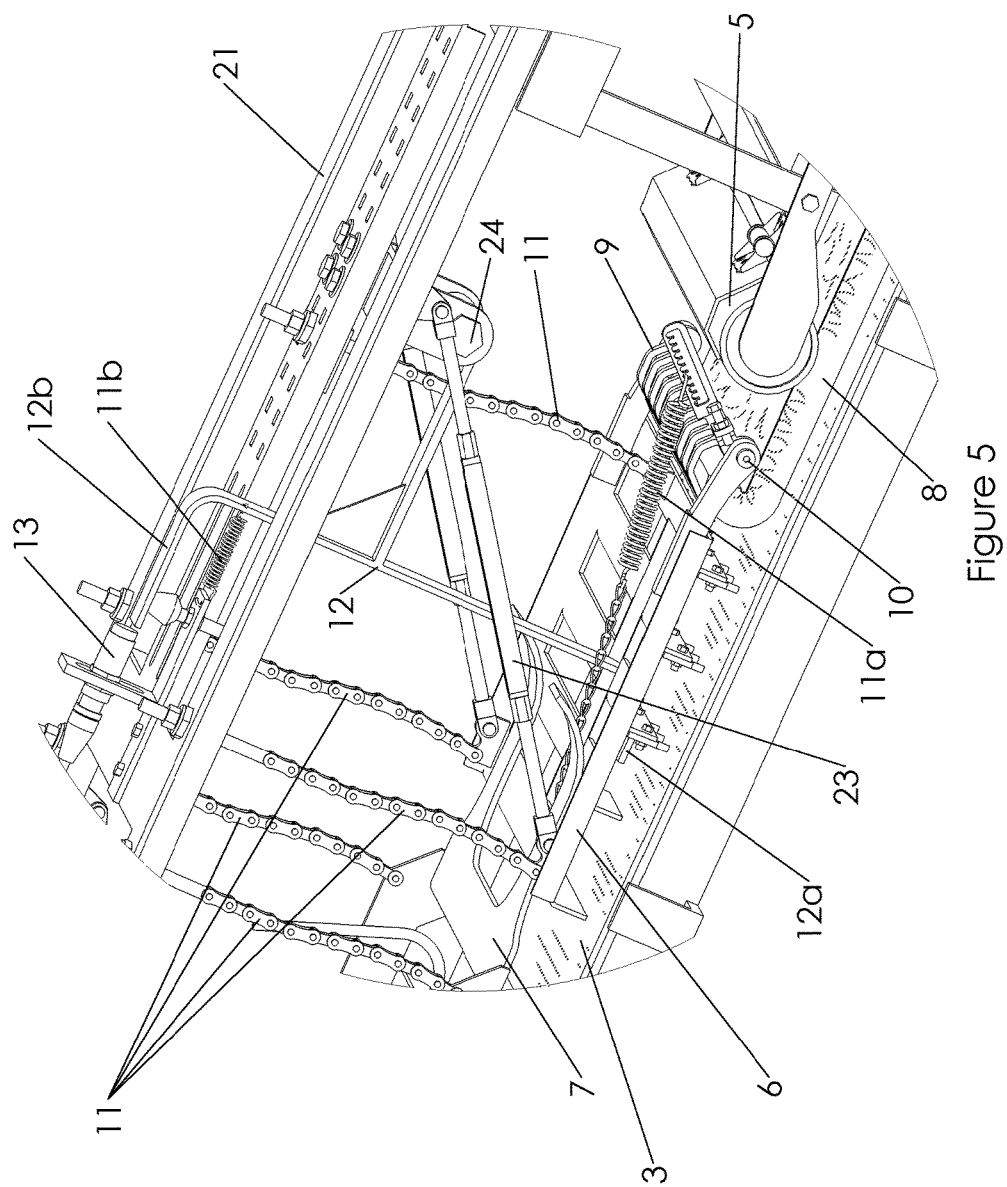
FIG. 5 is a detail perspective view of the flap control device of the present invention shown with a leading edge of a sod piece in contact with the start gate of the flap control device and beginning to roll.
Figure 6:
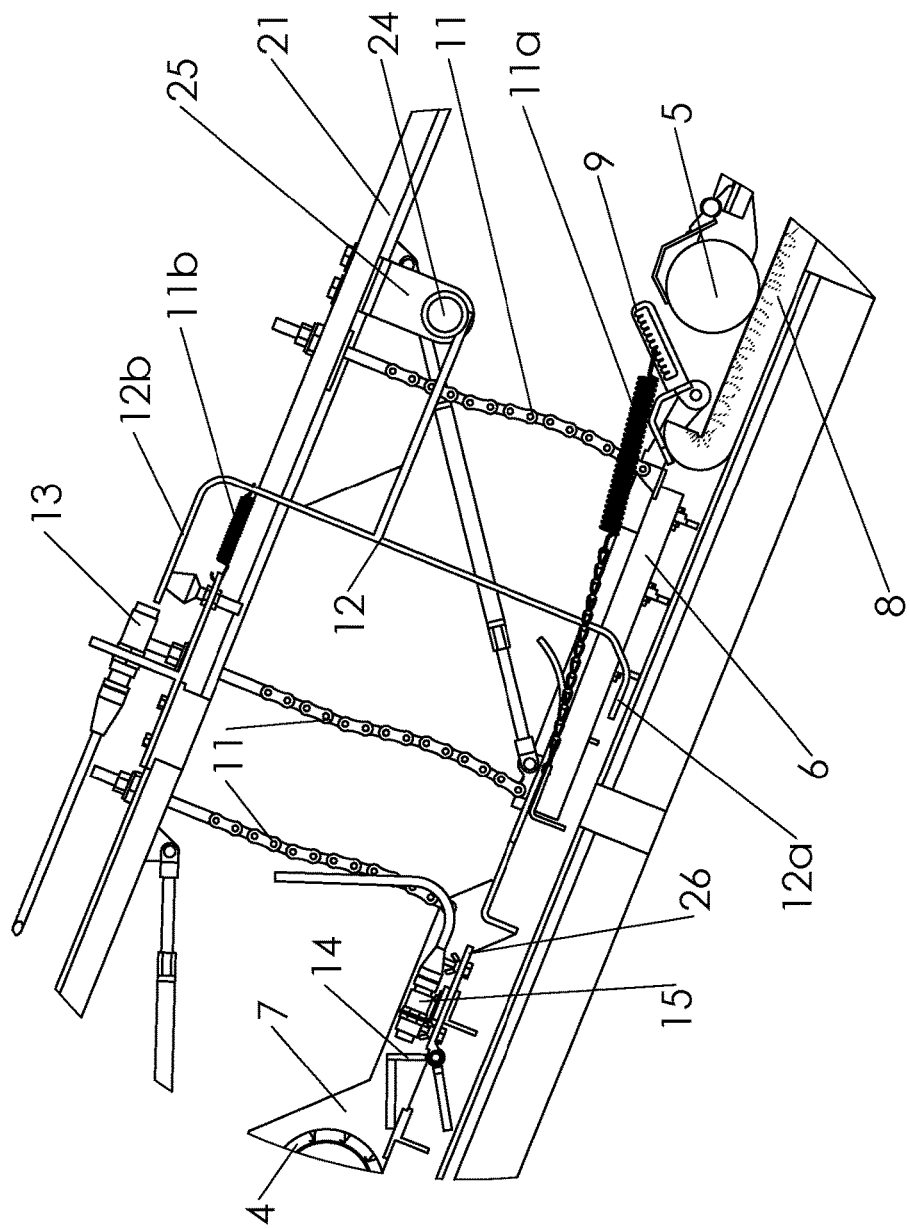
FIG. 6 is a side section view of what is shown in FIG. 5.

FIG. 5 is a perspective view of the flap control device of the present invention shown with a leading edge of a sod piece in contact with the start gate of the flap control device and beginning to roll. FIG. 6 is a side section view of what is shown in FIG. 5; the section is taken as indicated in FIG. 4A. As shown in these two figures, the sod piece 8 starts to form a roll when the leading edge of the sod piece 8 comes into contact with the start gate 9. The start gate 9 pivots upward on the pivot rods 10 to allow the leading (and beginning to roll) edge of the sod piece 8 to pass through it. Once the sod roll starts to form, the sod piece 8 continues rolling as it moves upward on the inclined conveyor 3. The front rollup ladder 6 maintains pressure on the forming sod roll so that it stays on the inclined conveyor 3.

Figure 7:
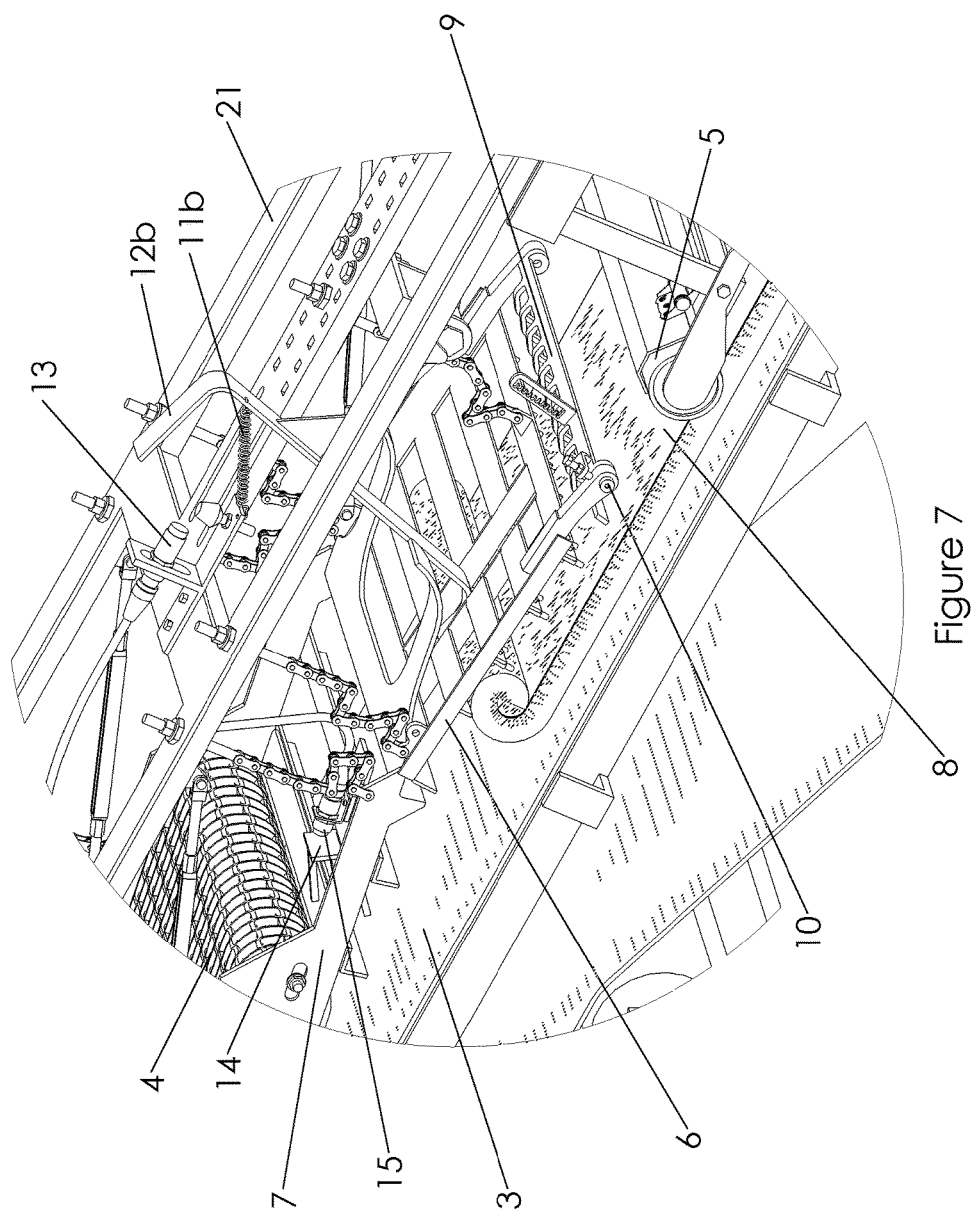
FIG. 7 is a first detail perspective view perspective view of the flap control device of the present invention shown with the leading (rolled) edge of the sod piece situated under the tail of the first switch and the first sensor in a deactivated position.
Figure 8:
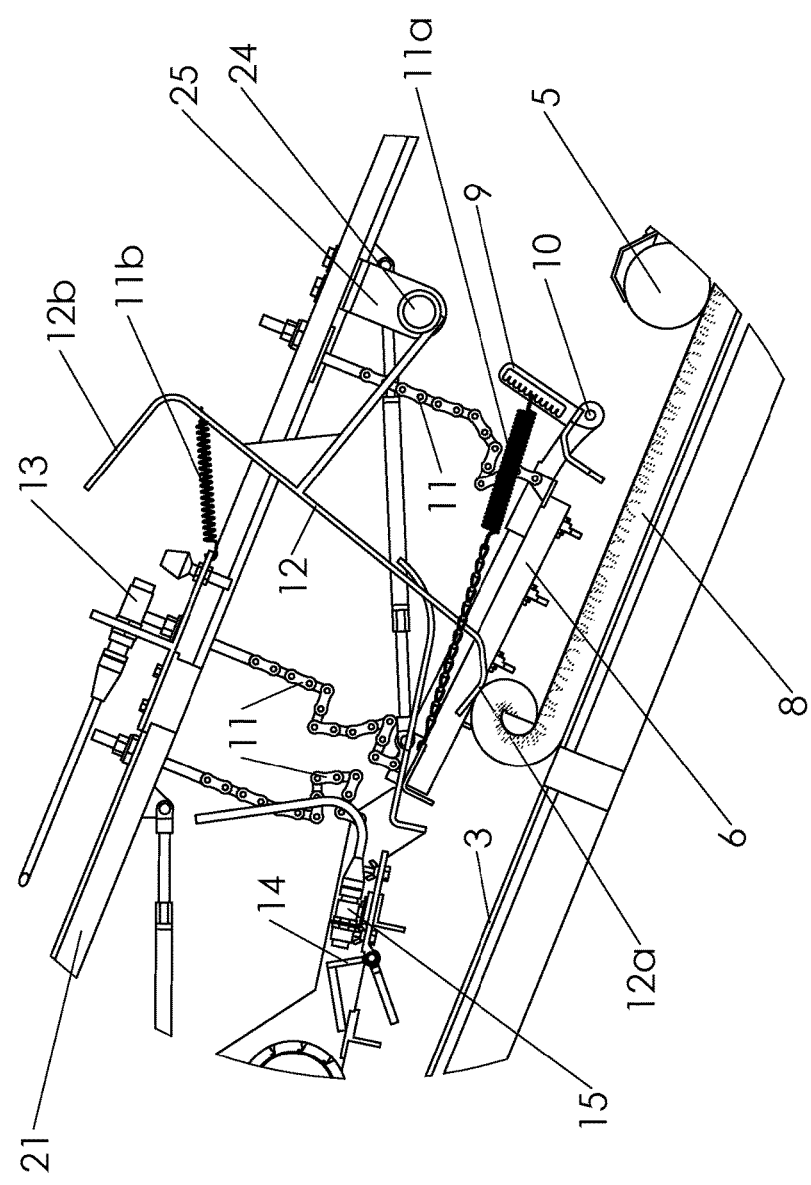
FIG. 8 is a side section view of what is shown in FIG. 7.

FIG. 7 is a perspective view of the flap control device of the present invention shown with the leading (rolled) edge of the sod piece situated under the tail of the first switch and the first sensor in a deactivated position. The turn buckle 23 and start gate spring 11a have been removed from this figure for clarity. FIG. 8 is a side section view of what is shown in FIG. 7; the section is taken as indicated in FIG. 4A. As shown in these two figures, the piece of sod 8 continues to roll (with the roll getting larger) as it makes its way up the inclined conveyor 3 and underneath the front rollup ladder 6. As this happens, the bottom end 12a of the first switch 12 rises, and the top end 12b of the first switch moves away from the first sensor 13.

Figure 10A:
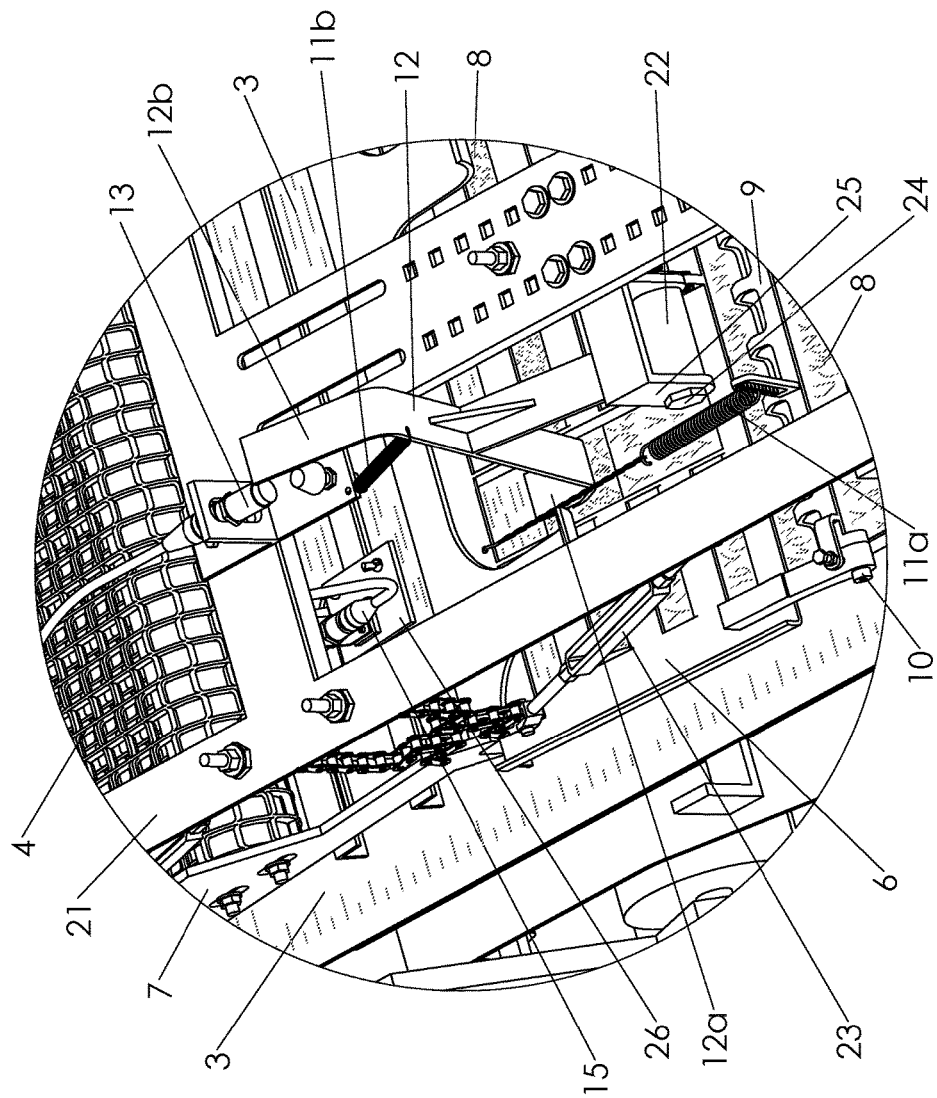
FIG. 10A is a top perspective view of what is shown in FIG. 7.
Figure 10B:
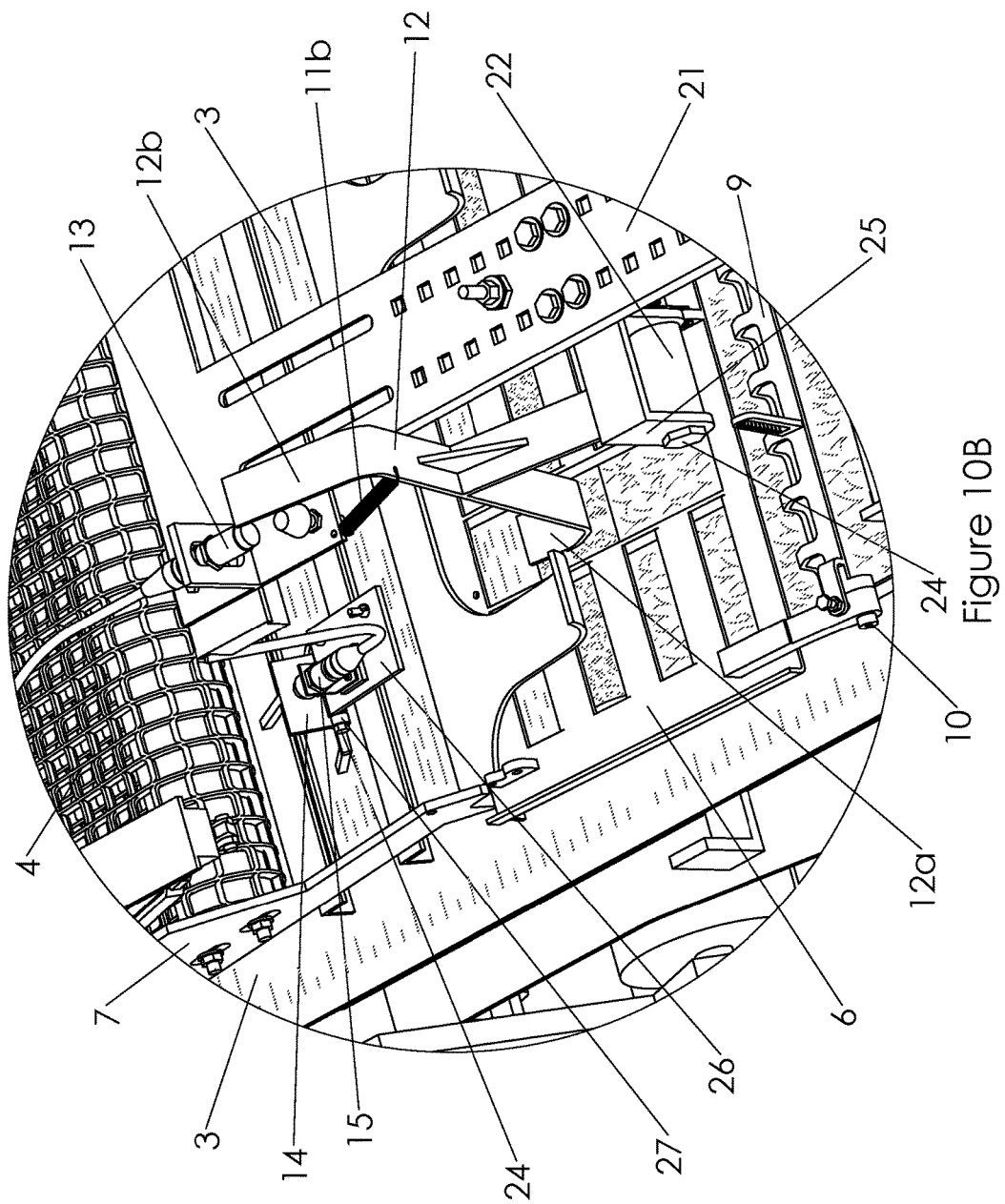
FIG. 10B is the same view shown in FIG. 10A except that two of the chains, one turn buckle, the start gate spring, and part of the hanging frame have been removed for clarity.
Figure 11:
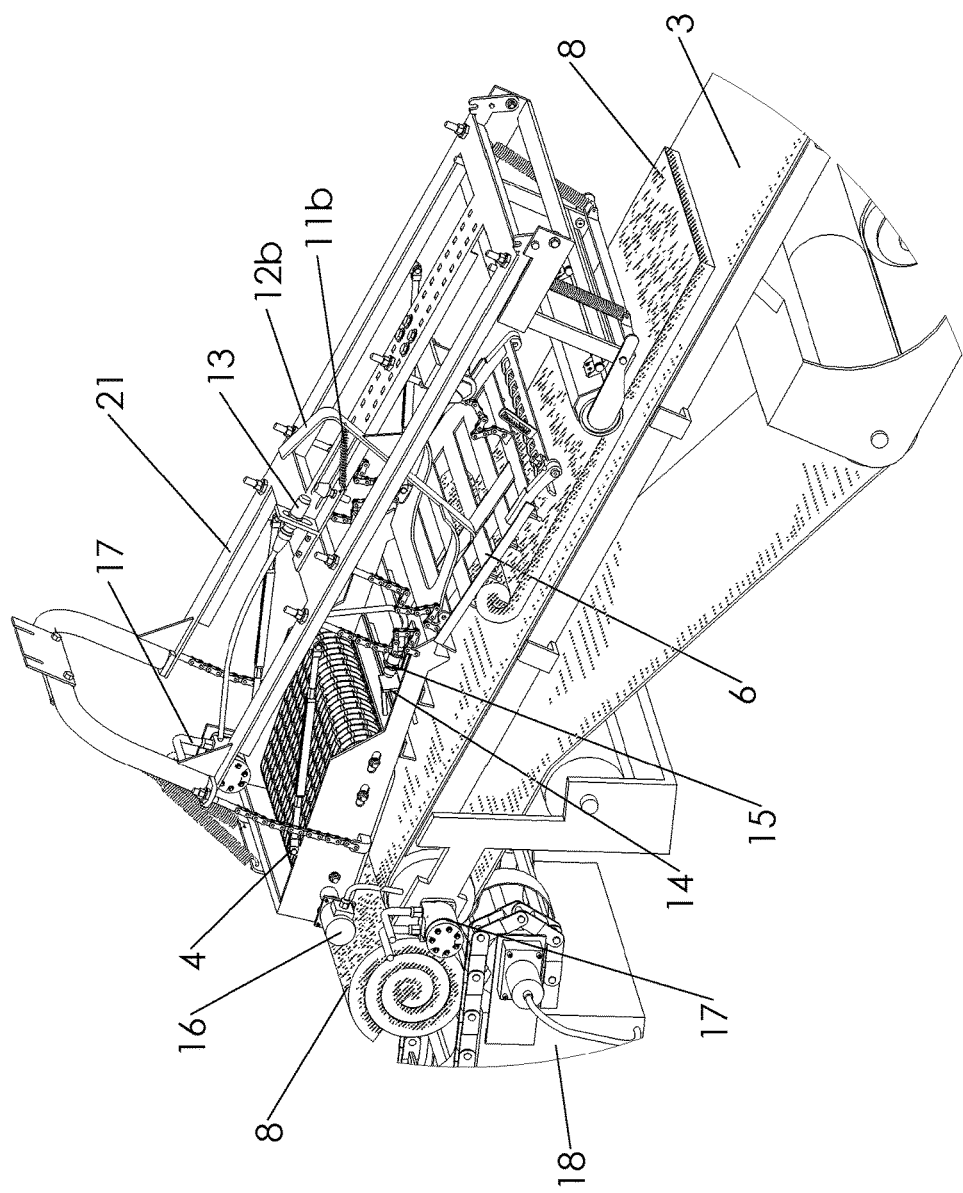
FIG. 11 is a wider perspective view of what is shown in FIG. 7.

FIG. 9 is a second detail perspective view of what is shown in FIG. 7. This view shows that the first switch 12 pivots on a collar 22 that rotates about a bolt 24 in a support bracket 25 that is attached (in this case, bolted) to the underside of the hanger frame 21. FIG. 10A is a top perspective view of what is shown in FIG. 7. This particular view shows more clearly how the bottom end 12a of the first switch 12 extends through the front rollup ladder 6. FIG. 10B is the same view shown in FIG. 10A except that two of the chains 11, one turn buckle 23, the start gate spring 11a, and part of the hanging frame 21 have been removed for clarity. FIG. 11 is a wider perspective view of what is shown in FIG. 7.

With regard to the first switch, the present invention is not limited to any particular configuration of the first switch, as long as it is positioned between the start gate 9 and the second switch 14, as long as the top end 12b of the first switch 12 is configured to interact with a first sensor 13, and as long as the first switch 12 is configured so that the bottom end of the first switch 12 extends through the front rollup ladder 6.

Figure 12A:
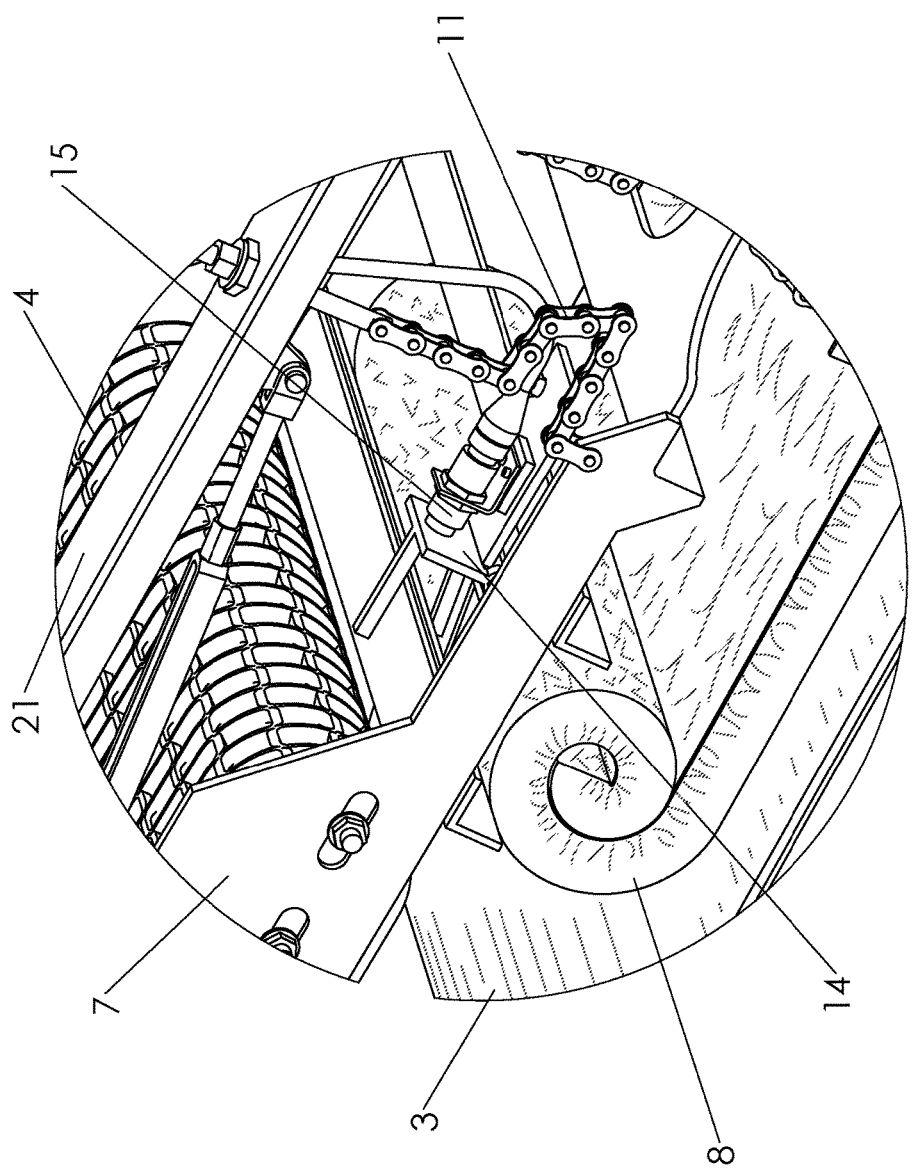
FIG. 12A is a detail perspective view of the flap control device of the present invention shown with the leading (rolled) edge of the sod piece situated underneath the second switch and the second sensor in an activated position.
Figure 12B:
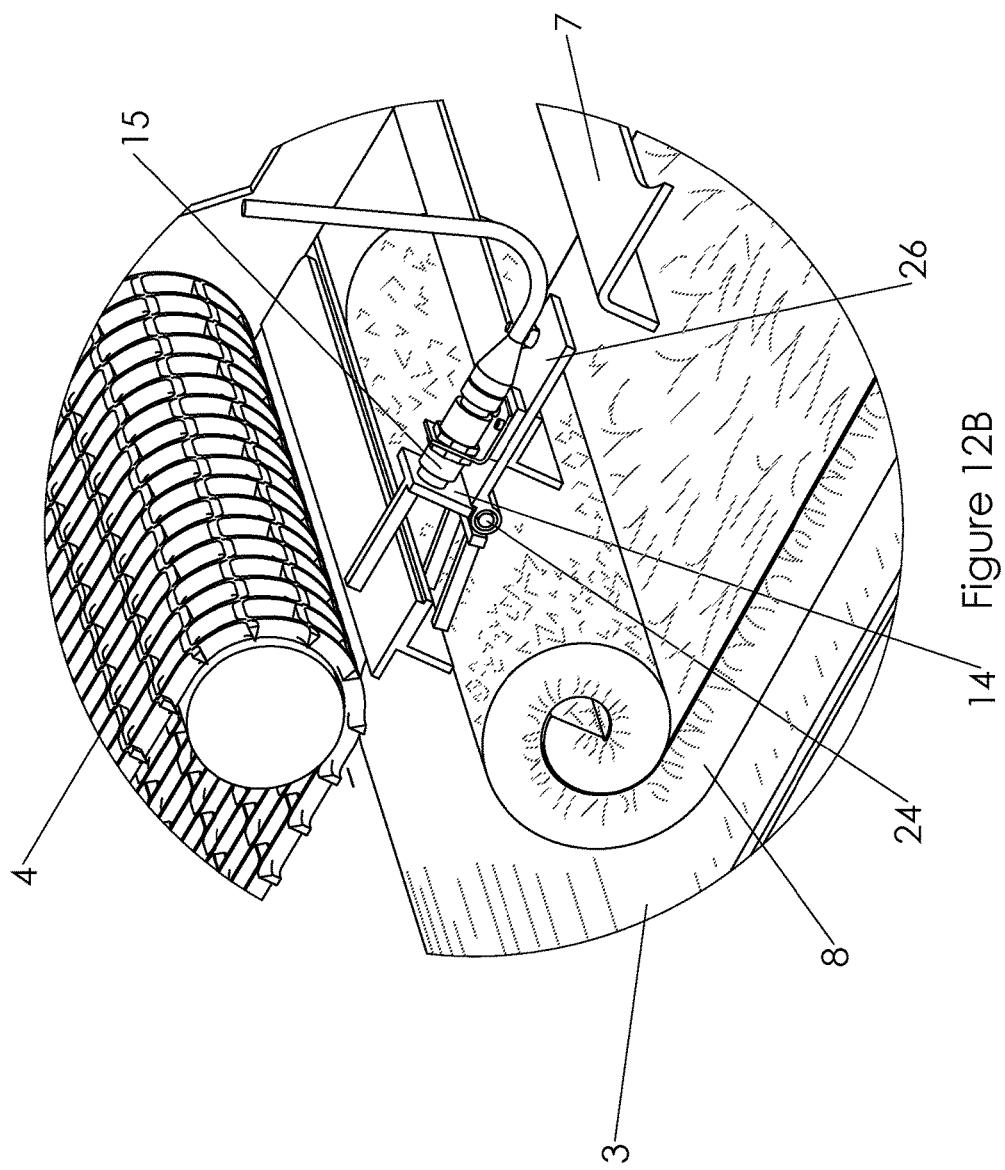
FIG. 12B is a perspective section view of what is shown in FIG. 12A.
Figure 13:
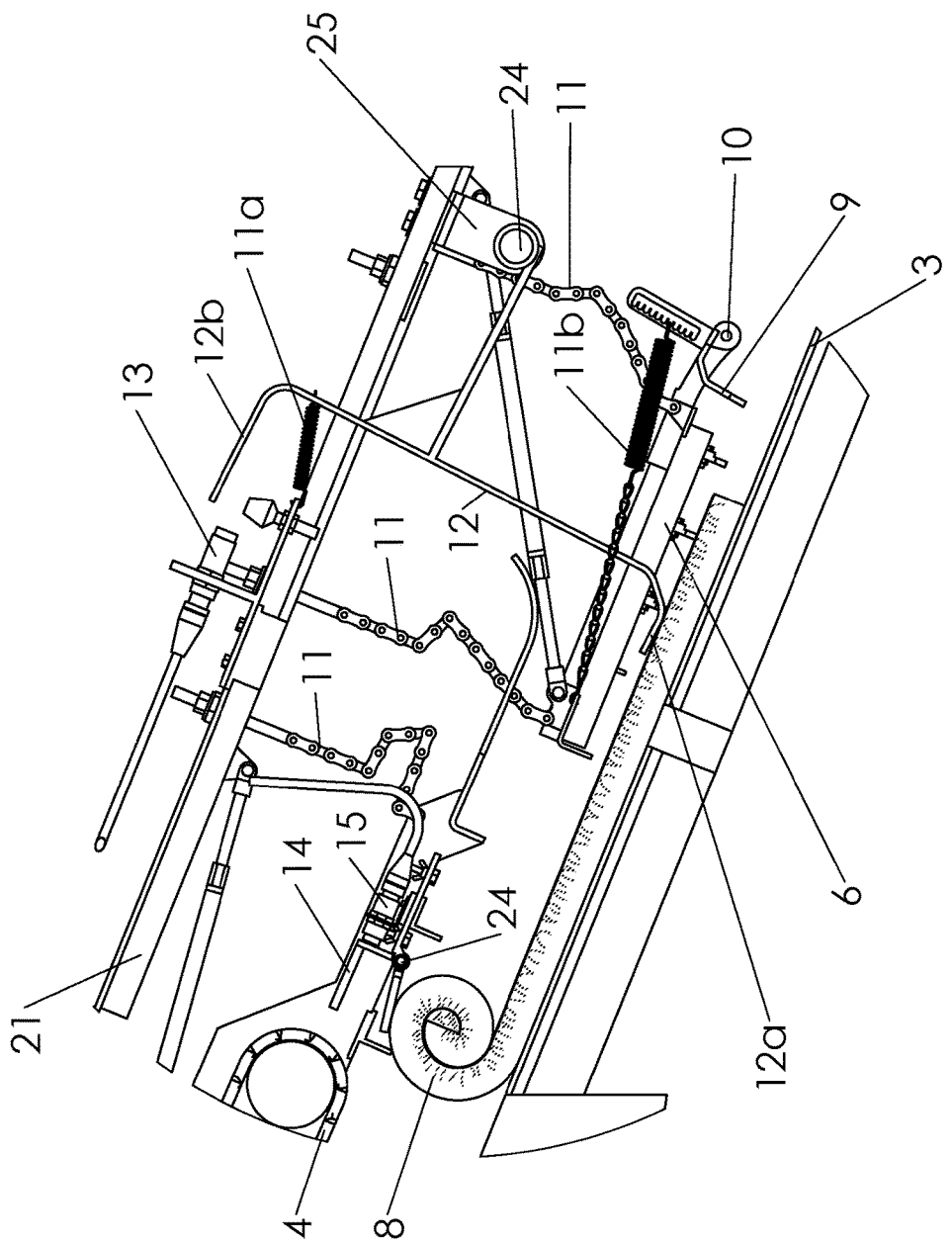
FIG. 13 is a side section view of what is shown in FIG. 12B.
Figure 14:
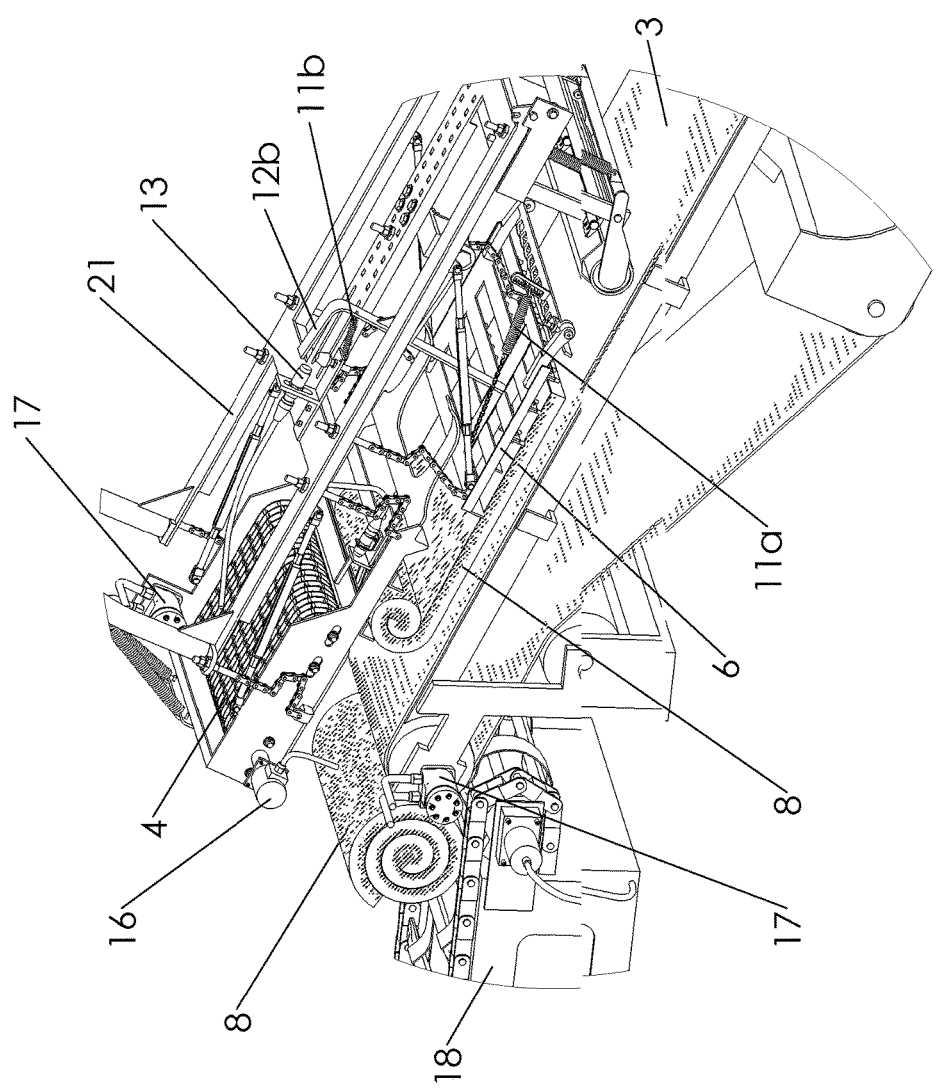
FIG. 14 is a wider perspective view of what is shown in FIG. 12A.

FIG. 12A is a detail perspective view of the flap control device of the present invention shown with the leading (rolled) edge of the sod piece situated underneath the second switch and the second sensor in an activated position. FIG. 12B is a perspective section view of what is shown in FIG. 12A; the section is taken as indicated in FIG. 4A. In this position, the piece of sod 8 (now a partially formed sod roll) has moved upward so that the second switch 14 is forced to rotate upward, thereby activating the second sensor 15. The trailing edge of the sod piece 8 is still underneath the front rollup ladder 6, with part of the sod piece 8 situated underneath the bottom end 12a of the first switch 12 (see FIG. 13). As long as there is a piece of sod 8 underneath the bottom end 12a of the first switch 12, the first sensor 13 will be deactivated. FIG. 13 is a side section view of what is shown in FIG. 12B; the section is taken as indicated in FIG. 4A. FIG. 14 is a wider perspective view of what is shown in FIG. 12A.

The present invention comprises a controller (not shown) with embedded software that controls the flap control device. When the second sensor 15 is activated, this software causes the rollup conveyor 4 to start. Specifically, the controller software causes the rollup conveyor 4 to start when the second sensor 15 is activated, the encoder 16 to begin counting when the first sensor 13 is activated, and the rollup conveyor 4 to stop when the encoder 16 counts a certain number of intervals (an interval being a measure of distance traveled rotationally by the rollup conveyor 4).

Figure 15:
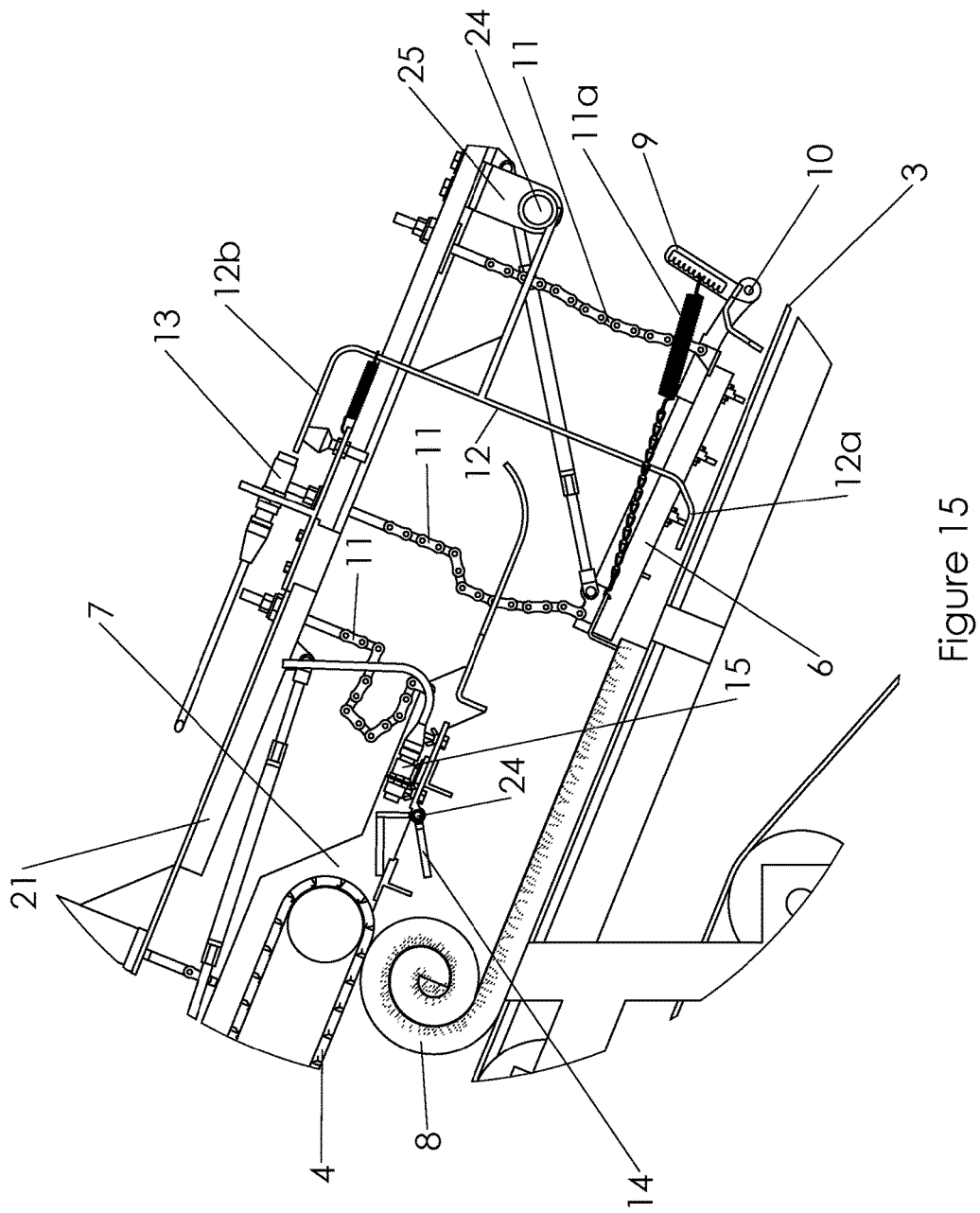
FIG. 15 is a side section view of the flap control device of the present invention shown with the trailing edge of the sod piece no longer situated underneath the tail of the first switch and the first sensor in an activated position.

FIG. 15 is a side section view of the flap control device of the present invention shown with the trailing edge of the sod piece no longer situated underneath the tail of the first switch and the first sensor in an activated position. At this juncture, the trailing edge of the sod piece 8 has moved out from underneath the bottom end 12a of the first switch 12, thereby causing the top end 12b of the first switch to move downward so that it is aligned with (in proximity to) the first sensor 13. In this position, the first sensor 13 is activated.

Activation of the first sensor 13 causes the encoder 16 to begin counting the rotational distance traveled by the rollup conveyor 4. This particular interval is preferably adjustable by the operator to ensure that the sod piece 8 continues to roll and that it is not ejected onto the platform 18 until the trailing edge (or flap) of the sod roll is in the preferred position. In the position shown in FIG. 16, the sod roll has moved past the second switch 14, and the sod roll is situated between the inclined conveyor 3 and the rollup conveyor 4. The sod piece 8 continues to roll as long as it is situated between the inclined conveyor 3 and the rollup conveyor 4 and both conveyors are moving at the same speed. (As noted above, whenever the rollup conveyor 4 is on, it is preferably moving at the same speed as the inclined conveyor 3.)

Figure 16:
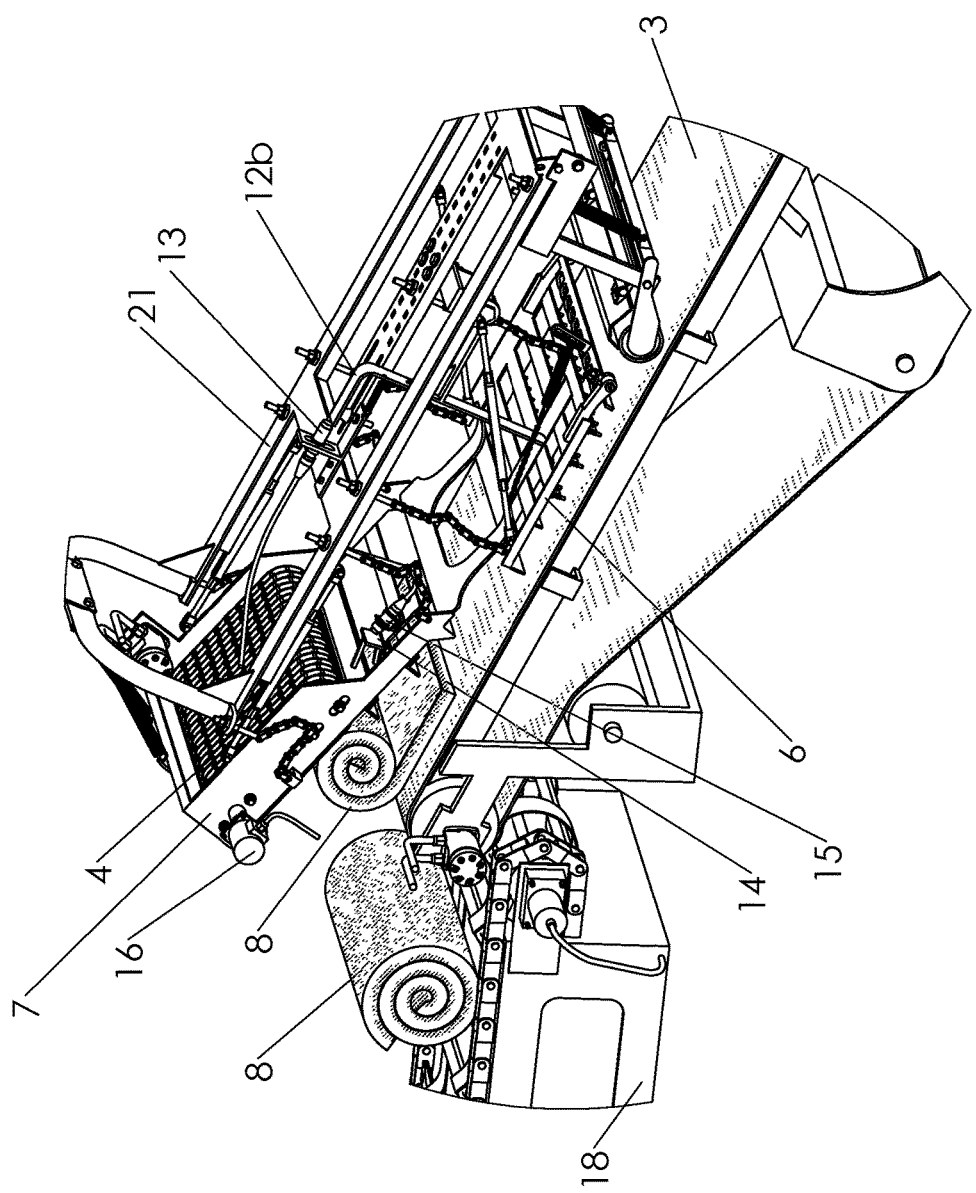
FIG. 16 is a perspective view of the flap control device of the present invention shown with the sod roll in a fully rolled position but with the flap not yet located in the preferred position.
Figure 17:
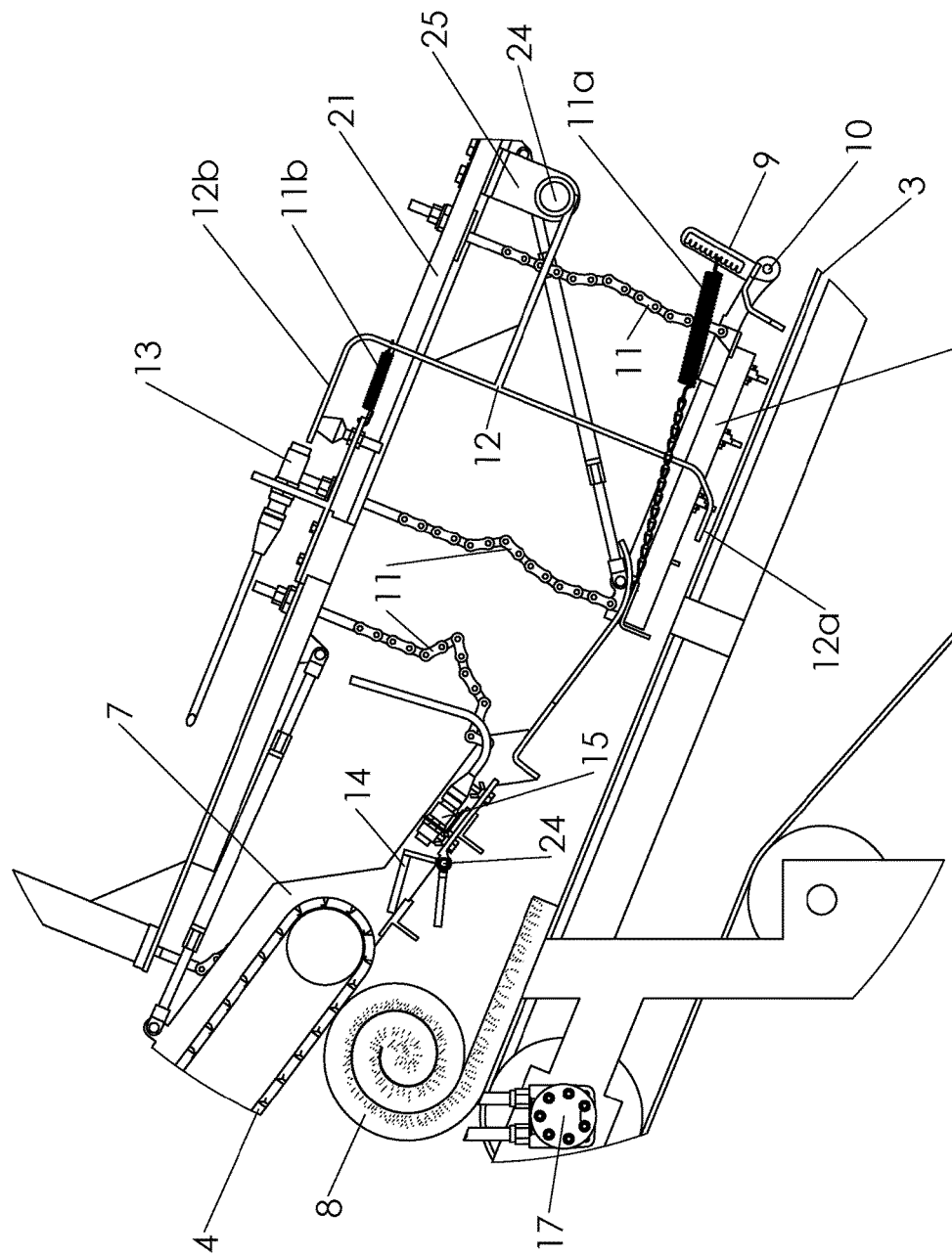
FIG. 17 is a side section view of what is shown in FIG. 16.

FIG. 16 is a perspective view of the flap control device of the present invention shown with the sod roll in a fully rolled position but with the flap not yet located in the preferred position. FIG. 17 is a side section view of what is shown in FIG. 16. At this stage, the sod piece 8 is continuing to roll and will continue to do so until the encoder 16 reaches the end of its counting limit (that is, its measurement of the distance traveled by the rollup conveyor 4). At that point, the controller software causes the rollup conveyor 4 to stop. When the rollup conveyor 4 stops rotating, the sod roll 8 is ejected by the inclined conveyor 3 onto the platform 18.

Figure 18:
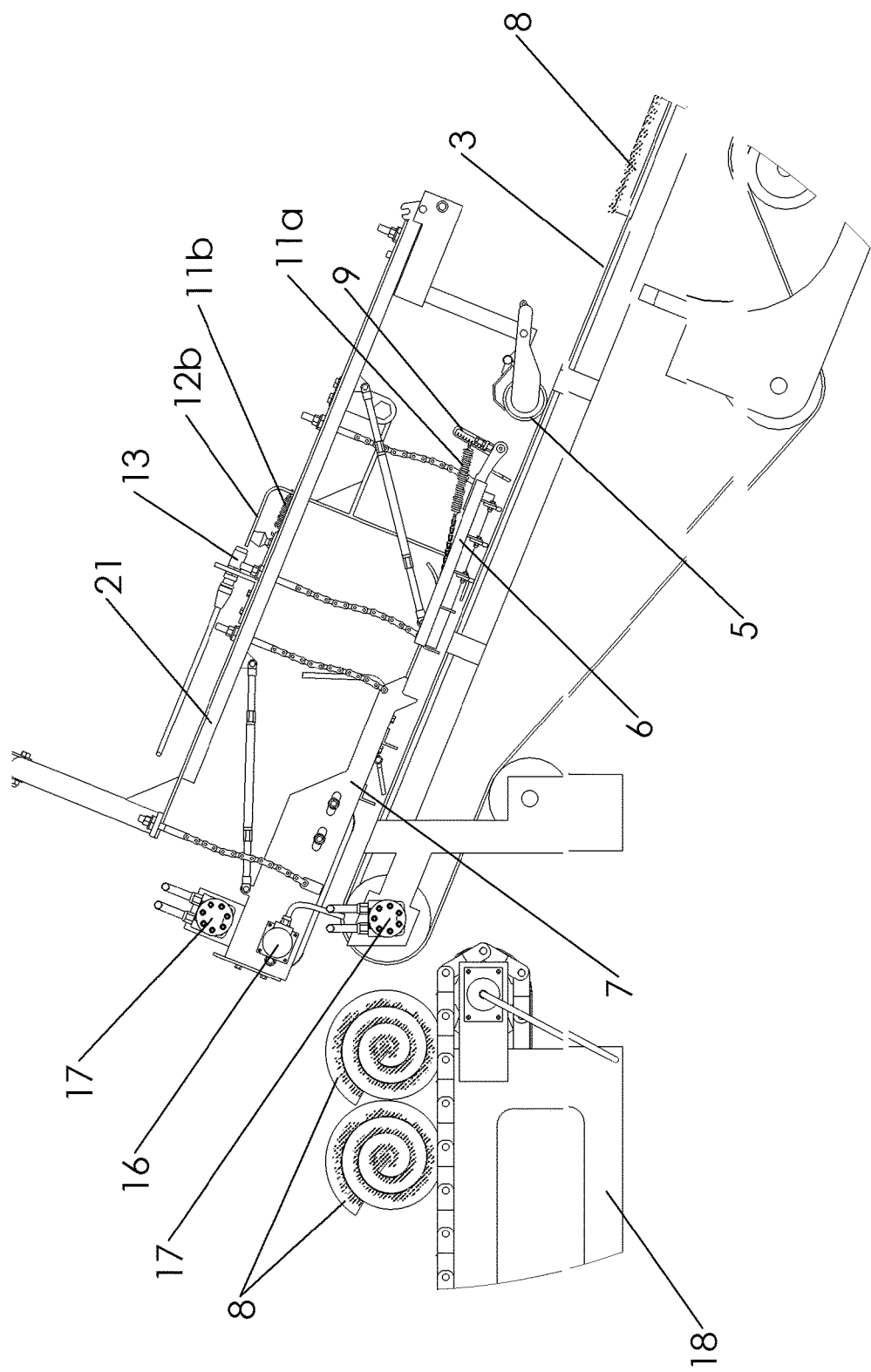
FIG. 18 is a side view of the flap control device of the present invention showing two sod rolls on the platform.

FIG. 18 is a side view of the flap control device of the present invention showing two sod rolls on the platform. Note that the present invention ensures that each sod roll will be placed onto the platform 18 with the end of the roll (or flap) in the same position each time, even if the sod piece 8 does not start rolling as soon as the leading edge of the sod piece 8 hits the start gate 9. If the sod piece 8 does not begin to roll until the leading edge of the sod piece 8 has passed the start gate 9, then the sod roll will be smaller around by the time it hits the second switch 14 than it would have been had the sod piece 8 begun to roll at the start gate 9. In this situation, however, the sod roll will continue to turn longer (in between the inclined conveyor 3 and the rollup conveyor 4) because it will take longer for the trailing edge of the sod piece 8 to clear the bottom end 12*a* of the first switch 12, thereby triggering the encoder 16 to count and the rollup conveyor 4 to stop after a certain interval. In other words, the present invention ensures that every sod roll is the same size before the encoder 16 begins to count because the trailing edge of the sod piece 8 must clear the bottom end 12*a* of the first switch 12 before the rollup conveyor 4 stops and the sod roll is ejected onto the platform 18.

Figure 19:
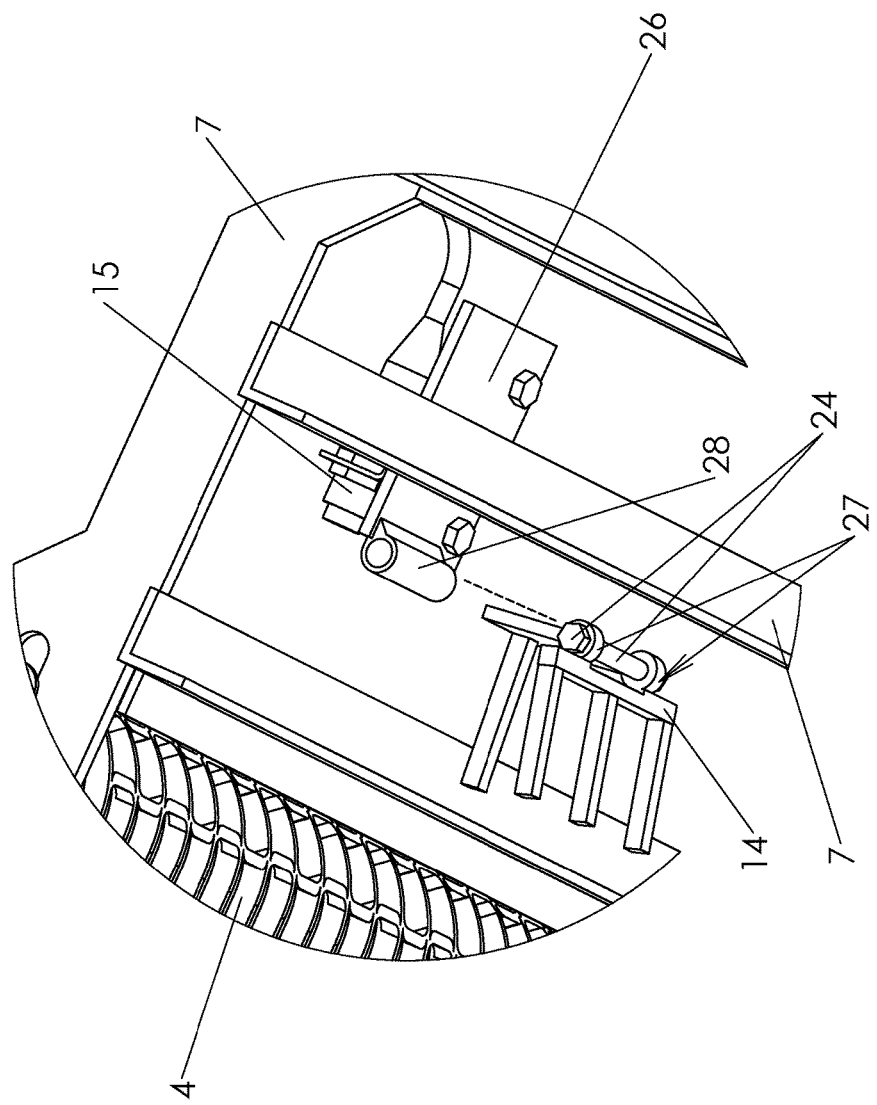
FIG. 19 is a bottom perspective view of the second switch.

FIG. 19 is a bottom perspective view of the second switch. As explained above, the second switch 14 is attached to two end collars 27 that rotate (or pivot) about a bolt 24. The bolt 24 extends through a collar 28 that is fixed to a plate 26. The plate 26 in turn is attached (welded) to the rear rollup frame 7. Note that the present invention is not limited to any particular configuration of the second switch 14, as long as it is positioned between the first switch 12 and the rollup conveyor 4, and as long as it is configured to interact with the second sensor 15. For example, the second switch may be attached to either the rear rollup frame 7, as shown in the drawings, or it may be attached to the front rollup ladder 6.

The invention described above, that is, with a second switch that starts the rollup conveyor upon being triggered by the sod roll, is an improvement over prior art (for example, the invention described in U.S. Pat. No. 7,021,584) because it provides a greater degree of accuracy in terms of starting the rollup conveyor.

Figure 20:
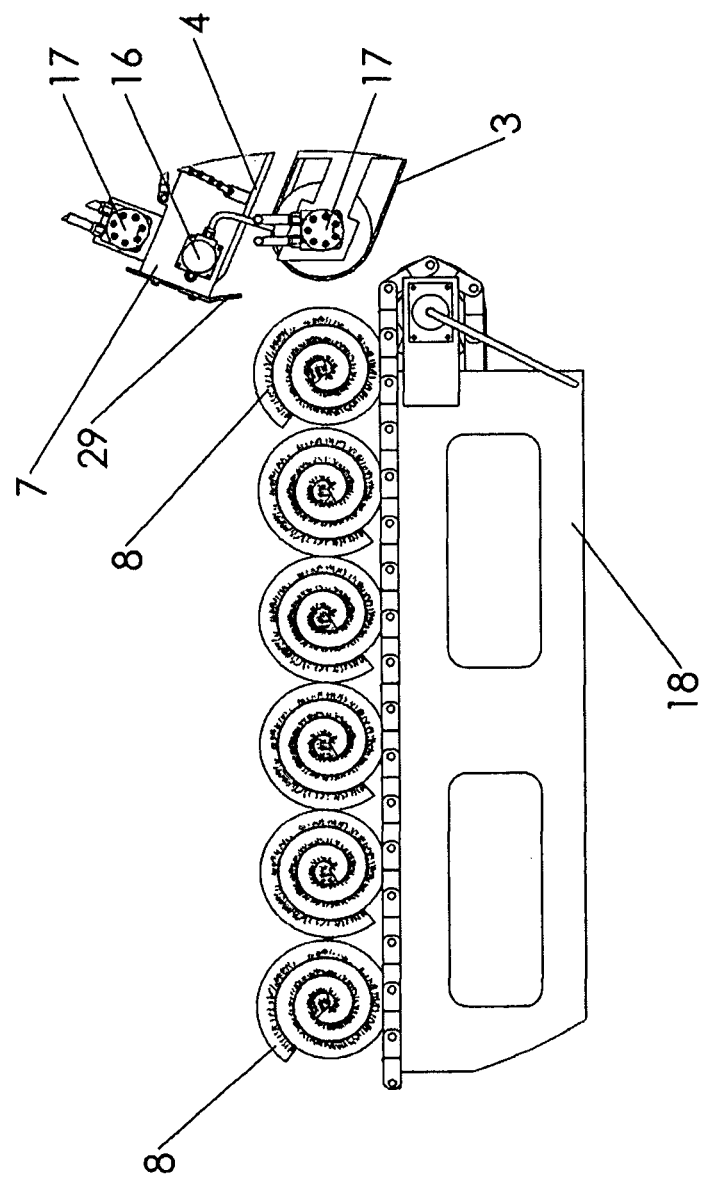
FIG. 20 is a side view of the present invention showing the over-rotation of the end roll in a group of sod rolls.

In the embodiment discussed above, the end of the roll (or flap) on each piece of sod that is deposited onto the platform 18 is in the same position; however, in an alternate embodiment, the software that controls the flap control device is programmed so that the first sod roll (also called the "end" roll) in a group of five sod rolls is rotated slightly longer than the other four sod rolls so that the flap is situated in a 10:00 position when the end roll is deposited onto the platform 18 (see FIG. 20). In other words, for every fifth sod roll 8, the controller software causes the rollup conveyor 4 to start when the second sensor 15 is activated (as described above), the encoder 16 to begin counting when the first sensor 13 is activated (as described above), and the rollup conveyor 4 to stop when the encoder 16 counts a certain number of intervals (the number of intervals being larger for the end sod roll than for the other four sod rolls in the same group). The duration of rotation of the end roll is preferably adjustable by the operator via a control screen in the cab of the harvester.

In FIG. 20, six sod rolls are shown on the platform 18; five of these sod rolls will be picked up by the sod carrier (not shown) and deposited onto a pallet (not shown). Thus, the sixth sod roll (that is, the one closest to the inclined conveyor 3) will be the end roll in the next group of sod rolls. As used herein, the term "end roll" or means the roll of sod that is the first in a group of sod rolls that are sequentially deposited onto the platform 18 and picked up simultaneously by the sod carrier. When the group of sod rolls is deposited onto the pallet, the array of sod rolls appears neater and more attractive if the flaps on the end rolls (which face the outside of the pallet) are all in the 10:00 position. Note that the flaps on the next three sod rolls in the group do not need to be at a 10:00 position because they are interior sod rolls (that is, they do not face the outside of the pallet when the sod rolls are arranged on the pallet), and the flaps on these rolls are held in place by virtue of the fact that the flap abuts up against an adjacent sod roll. Although the fifth or last sod roll in the group is an exterior sod roll (that is, it does have a side that is exposed to the outside of the pallet), the flap on this sod roll faces inward rather than outward on the pallet and is held in place by abutting up against the adjacent sod roll; therefore, there is no need to over-rotate this particular sod roll either.

Note that in the embodiment shown in FIG. 20, five sod rolls 8 constitute a group that is then lifted off of the platform 18 by the sod carrier and deposited onto a pallet. The present invention is not limited to any particular number of sod rolls being picked up at once; rather, the invention constitutes rotating the first or "end" roll in a group of sod rolls (all of which are picked up at the same time by the sod carrier) more than the other sod rolls in the group so that the flap on the end roll is positioned differently than the flap on the other sod rolls in the same group. In a preferred embodiment, the flaps on the five non-end sod rolls are in the 7:00 position, and the flap on the end roll is in a 10:00 position.

Figure 21:
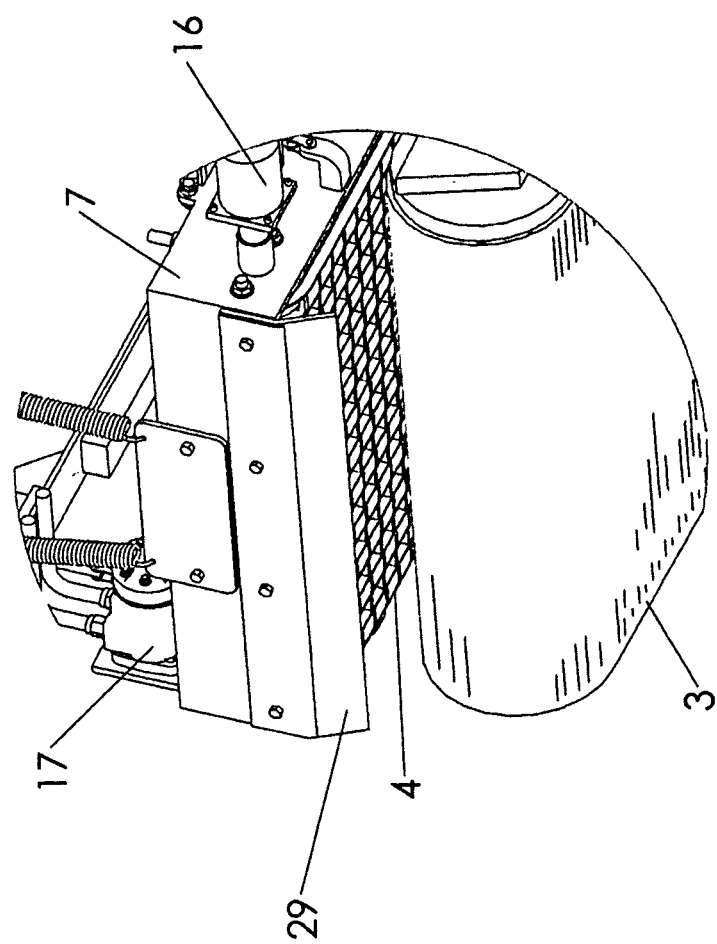
FIG. 21 is a detail view of the rubber bumper on the rear end of the rear rollup frame.

In the embodiment shown in FIGS. 20 and 21, a rubber bumper 29 has been secured to the rear of the rear rollup frame 7 and extends beneath the rollup conveyor 4. Preferably, the rubber bumper 29 extends the entire width of the rollup conveyor 4. The purpose of this rubber bumper 29 is to prevent the flap on the end roll from opening up clockwise (that is, from flapping over from the 10:00 position shown in FIG. 20 to a 1:00 or greater position) and getting caught up in the rollup conveyor 4. The rubber bumper 29 is situated so that if the flap on the end roll were to open up (clockwise from the vantage point of FIG. 20), the rubber bumper 29 would knock the flap back into place (that is, back into its 10:00 position). Although the bumper is rubber in a preferred embodiment, it could be made of any suitable material.

In an alternate embodiment, the distance of rotation of the rollup conveyor (i.e., when the rollup conveyor starts rotating and when it stops rotating) is controlled by a timer in lieu of the encoder described above, but all other aspects of the invention are the same as previously described. In the timer embodiment, the controller software still causes the rollup conveyor 4 to start when the second sensor 15 is activated, but it also causes the rollup conveyor 4 to stop when the timer (not the encoder) has reached a predetermined amount of time (either set as a default value in the software or set by the operator via the control on the display in the cab).

In this particular embodiment, the controller software includes an oscillator (timer) that begins counting as soon as the first sensor is activated (as stated above, as long as there is a piece of sod underneath the bottom end of the first switch, the first sensor is deactivated; conversely, when the sod piece clears the first sensor, the first sensor is activated). Once the timer reaches a predetermined amount of time, the controller software causes the rollup conveyor motor to stop, which in turn causes the rollup conveyor to stop rotating. This predetermined amount of time is pre-programmed as a default value in the controller software, and in a preferred embodiment, the operator can adjust the amount of time via a control screen in the cab of the harvester.

In a preferred embodiment, the amount of time during which the rollup conveyor rotates is scaled dynamically based upon conveyor speed to maintain a link between time and distance. This scaling, which is explained further below, eliminates the need for the operator to continually adjust the timer each time the conveyor speed changes.

As explained above, the flap position control process is initiated using two proximity sensors wired as inputs providing true or false signals into a microcontroller. The microcontroller is programmed specifically for starting and stopping the rollup motor. The microcontroller contains an output wire providing electrical voltage to start the rollup motor. The rollup motor is started when: Sensor 1=false AND sensor 2 transitions from false to true AND output to motor is false. Once the condition is met, a latch is set in the software sending voltage to start the rollup motor. The rollup motor is stopped using a timer process that begins when: Sensor 2=true AND sensor 1 transitions from false to true AND rollup motor is current on. This timer process is initiated to monitor the amount of time (in milliseconds) during which the rollup motor has been on. The motor is stopped once the timer reaches the amount of time defined by the operator.

In a preferred embodiment, the amount of time is an 8-bit number (0-255) scaled dynamically using the frequency input from the inclined conveyor motor. The frequency input to the microcontroller from the inclined conveyor motor is directly related to the speed of the inclined conveyor. The frequency of the inclined conveyor motor is a 16-bit value that is run through an average filter to stabilize the number and then multiplied by an adjustable parameter and applied to the maximum output side of the timer scale. As the inclined conveyor slows down, the maximum scaled value of the timer increases, thereby allowing the rollup conveyor to be on longer. As the inclined conveyor speed increases, the maximum scaled value of the timer decreases, thereby allowing the rollup motor to be on for a shorter period of time.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:
1. A sod harvester comprising:
(a) a start gate;
(b) a first switch that is configured to interact with a first sensor;
(c) a second switch that is configured to interact with a second sensor;
(d) an inclined conveyor with a first end and a second end;
(e) a rollup conveyor positioned above the second end of the inclined conveyor; and
(f) a controller including controller software that is configured to cause the rollup conveyor to start upon activation of the second sensor, a timer to begin counting time upon activation of the first sensor, and the rollup conveyor to stop upon the counting of a certain amount of time by the timer;
wherein the first switch is positioned between the start gate and the second switch;
wherein the second switch is positioned between the first switch and the rollup conveyor;
wherein the inclined conveyor is configured to eject a sod roll onto a platform upon cessation of rotation by the rollup conveyor; and
wherein the rollup conveyor is situated within a rear rollup frame; and
a bumper that is secured to a rear of the rear rollup frame, the bumper extending beneath the rollup conveyor along a width of the rollup conveyor and configured to prevent from over-rotating an end flap on a first sod roll in a plurality of sod rolls that are picked up simultaneously by a sod carrier and deposited simultaneously onto a pallet, each of the sod rolls in the plurality of sod rolls having an end flap, the end flap on all but the first sod roll in the plurality of sod rolls being at a same position, the end flap on the first sod roll being in a different position, and the end flap on the first sod roll being at a position between nine o'clock and twelve o'clock when the first sod roll is viewed from a side of the first sod roll.

* * * * *